United States Patent
Liu et al.

(10) Patent No.: US 12,495,404 B2
(45) Date of Patent: Dec. 9, 2025

(54) SIDELINK FEEDBACK FOR INCREASED CAPACITY

(71) Applicant: QUALCOMM Incorporated, San Diego, CA (US)

(72) Inventors: Chih-Hao Liu, San Diego, CA (US); Xiaoxia Zhang, San Diego, CA (US); Jing Sun, San Diego, CA (US); Giovanni Chisci, San Diego, CA (US); Stelios Stefanatos, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 529 days.

(21) Appl. No.: 17/958,042

(22) Filed: Sep. 30, 2022

(65) Prior Publication Data

US 2024/0114495 A1    Apr. 4, 2024

(51) Int. Cl.
*H04W 72/0453* (2023.01)
*H04L 27/26* (2006.01)
*H04W 52/16* (2009.01)
*H04W 52/36* (2009.01)

(52) U.S. Cl.
CPC ..... *H04W 72/0453* (2013.01); *H04L 27/2607* (2013.01); *H04W 52/16* (2013.01); *H04W 52/367* (2013.01)

(58) Field of Classification Search
CPC ................................. H04W 72/0453
See application file for complete search history.

(56) References Cited

U.S. PATENT DOCUMENTS

| | | | |
|---|---|---|---|
| 2020/0153574 A1* | 5/2020 | Shin | H04W 4/40 |
| 2021/0091901 A1 | 3/2021 | Sun et al. | |
| 2023/0039007 A1* | 2/2023 | Zhao | H04L 5/0033 |
| 2024/0097827 A1* | 3/2024 | Lee | H04W 4/08 |
| 2024/0098791 A1* | 3/2024 | Cheng | H04W 76/28 |
| 2024/0121760 A1* | 4/2024 | Lin | H04W 72/40 |
| 2025/0151086 A1* | 5/2025 | Talarico | H04W 72/25 |
| 2025/0185048 A1* | 6/2025 | Wirth | H04L 1/1861 |

FOREIGN PATENT DOCUMENTS

WO    WO-2021189428 A1    9/2021

OTHER PUBLICATIONS

International Search Report and Written Opinion—PCT/US2023/075075—ISA/EPO—Mar. 18, 2024.

\* cited by examiner

*Primary Examiner* — Jason E Mattis
(74) *Attorney, Agent, or Firm* — Holland & Hart LLP

(57) ABSTRACT

Methods, systems, and devices for wireless communications are described. Generally, the described techniques provide for a user equipment (UE) to transmit feedback information via a configurable quantity of interlaced resource blocks (IRBs) in one or more interlaces of a sidelink feedback channel. For example, the UE may transmit feedback via multiple IRBs of an interlace. The UE may determine which IRBs to use in accordance with a configuration, which may indicate a quantity of IRBs, a distribution of the IRBs, a pattern of the IRBs, or any combination thereof. Additionally, or alternatively, the UE may determine to transmit feedback via multiple IRBs of an interlace that is different from a common interlace.

28 Claims, 15 Drawing Sheets

Regular PF0 410

Enhanced PF0 415

RB Set 405

SIDELINK FEEDBACK FOR INCREASED CAPACITY

FIELD OF TECHNOLOGY

The following relates to wireless communications, including sidelink feedback for increased capacity.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless communications systems may support sidelink communications between one or more wireless devices (e.g., UEs). In some examples, UEs communicating via sidelink may select resources from resources included in a sidelink feedback channel (e.g., physical sidelink feedback channel (PSFCH)) and utilize the selected resource to receive feedback messages responsive of previously received sidelink messages.

SUMMARY

The described techniques relate to improved methods, systems, devices, and apparatuses that support sidelink feedback for increased capacity. For example, the described techniques enable a user equipment (UE) to transmit feedback information via a configurable quantity of interlaced resource blocks (IRBs) in one or more interlaces of a sidelink feedback channel. For example, the UE may transmit feedback via multiple IRBs of an interlace, which may increase an allowable transmission power for the feedback transmission. In such an example, the UE may determine which IRBs to use in accordance with a configuration, which may indicate a quantity of IRBs, a distribution of the IRBs, a pattern of the IRBs, or any combination thereof. Additionally, or alternatively, the UE may determine to transmit feedback via multiple IRBs of an interlace that is different from a common interlace. That is, the UE may transmit feedback via IRBs of a first interlace that are offset from IRBs of a common interlace, which may improve transmission power for the feedback information. In some cases, the UE may reduce a transmission power for a common IRB, a feedback carrying IRB, or both, to avoid exceeding a power spectral density (PSD) limit.

A method for wireless communications at a first UE is described. The method may include receiving, from a second UE, a sidelink message via a set of resources of a sidelink channel, generating, based at least on the sidelink message, a set of multiple feedback indications, and transmitting, via a sidelink feedback channel to the second UE and in accordance with an interlace, the set of multiple feedback indications via one or more configurable resources, the interlace indicating a set of multiple frequency resources including the one or more configurable resources, where the set of multiple frequency resources are uniformly distributed across a bandwidth of the sidelink feedback channel.

An apparatus for wireless communications at a first UE is described. The apparatus may include a processor, memory coupled with the processor, and instructions stored in the memory. The instructions may be executable by the processor to cause the apparatus to receive, from a second UE, a sidelink message via a set of resources of a sidelink channel, generate, based at least on the sidelink message, a set of multiple feedback indications, and transmit, via a sidelink feedback channel to the second UE and in accordance with an interlace, the set of multiple feedback indications via one or more configurable resources, the interlace indicating a set of multiple frequency resources including the one or more configurable resources, where the set of multiple frequency resources are uniformly distributed across a bandwidth of the sidelink feedback channel.

Another apparatus for wireless communications at a first UE is described. The apparatus may include means for receiving, from a second UE, a sidelink message via a set of resources of a sidelink channel, means for generating, based at least on the sidelink message, a set of multiple feedback indications, and means for transmitting, via a sidelink feedback channel to the second UE and in accordance with an interlace, the set of multiple feedback indications via one or more configurable resources, the interlace indicating a set of multiple frequency resources including the one or more configurable resources, where the set of multiple frequency resources are uniformly distributed across a bandwidth of the sidelink feedback channel.

A non-transitory computer-readable medium storing code for wireless communications at a first UE is described. The code may include instructions executable by a processor to receive, from a second UE, a sidelink message via a set of resources of a sidelink channel, generate, based at least on the sidelink message, a set of multiple feedback indications, and transmit, via a sidelink feedback channel to the second UE and in accordance with an interlace, the set of multiple feedback indications via one or more configurable resources, the interlace indicating a set of multiple frequency resources including the one or more configurable resources, where the set of multiple frequency resources are uniformly distributed across a bandwidth of the sidelink feedback channel.

Some examples of the method, apparatuses, and non-transitory computer-readable medium described herein may further include operations, features, means, or instructions for transmitting, at a first time, a first quantity of feedback indications via the one or more configurable resources at a first transmit power and transmitting, at a second time, a second quantity of feedback indications via the one or more configurable resources at a second transmit power, where the first quantity may be a same quantity as the second quantity and the first transmit power may be lower than the second transmit power.

In some examples of the method, apparatuses, and non-transitory computer-readable medium described herein, transmitting the set of multiple feedback indications may include operations, features, means, or instructions for transmitting each feedback indication of the set of multiple feedback indications via a first cyclic shift pair of a first set of multiple cyclic shift pairs via a respective frequency resource of the one or more configurable resources, where each frequency resource of the set of multiple frequency resources includes a set of multiple cyclic shift pairs corresponding to a set of multiple cyclic shift pair indices.

In some examples of the method, apparatuses, and non-transitory computer-readable medium described herein, transmitting the set of multiple feedback indications via the one or more configurable resources may include operations, features, means, or instructions for transmitting one or more dummy signals via a remaining quantity of frequency resources of the set of multiple frequency resources, where each dummy signal of the one or more dummy signals may be transmitted via a second cyclic shift pair of a second set of multiple cyclic shift pairs associated with a respective frequency resource of the remaining quantity of frequency resources, where the second cyclic shift pair may be a first reserved cyclic shift pair for transmitting dummy signals.

In some examples of the method, apparatuses, and non-transitory computer-readable medium described herein, a cyclic shift pair index of the first reserved cyclic shift pair of the respective frequency resource may be offset from a cyclic shift pair index of a second reserved cyclic shift pair of a subsequent frequency resource of the set of multiple frequency resources.

Some examples of the method, apparatuses, and non-transitory computer-readable medium described herein may further include operations, features, means, or instructions for receiving a message including an indication of a quantity of feedback indications to transmit, a pattern associated with the set of multiple frequency resources, or both, where the set of multiple feedback indications may be transmitted based on the message.

In some examples of the method, apparatuses, and non-transitory computer-readable medium described herein, the sidelink channel includes a set of multiple interlaces and the set of multiple frequency resources may be associated with a first interlace of the set of multiple interlaces and the method, apparatuses, and non-transitory computer-readable medium may include further operations, features, means, or instructions for transmitting the set of multiple feedback indications via a first interlace of the set of multiple interlaces that may be different from a second interlace of the set of multiple interlaces, where the second interlace may be a common interlace.

Some examples of the method, apparatuses, and non-transitory computer-readable medium described herein may further include operations, features, means, or instructions for transmitting a feedback indication of the set of multiple feedback indications, a dummy signal associated with the second interlace, or both, according to a transmit power that may be below a threshold power based on a quantity of frequency resources between a first frequency resource of the one or more configurable resources for the feedback indication and a second frequency resource of the dummy signal exceeding a threshold quantity of frequency resources.

In some examples of the method, apparatuses, and non-transitory computer-readable medium described herein, the interlace includes a set of multiple interlaces and the set of multiple frequency resources may be associated with a first interlace of the set of multiple interlaces and the method, apparatuses, and non-transitory computer-readable medium may include further operations, features, means, or instructions for transmitting the set of multiple feedback indications via the first interlace, a second interlace, or both, where the second interlace may be a common interlace.

Some examples of the method, apparatuses, and non-transitory computer-readable medium described herein may further include operations, features, means, or instructions for transmitting the set of multiple feedback indications via a first subset of the set of multiple frequency resources, where the first subset includes the one or more configurable resources and transmitting one or more dummy signals via remaining frequency resources of the first subset, via one or more frequency resources of a second subset of the set of multiple frequency resources, or both.

Some examples of the method, apparatuses, and non-transitory computer-readable medium described herein may further include operations, features, means, or instructions for receiving an indication to transmit the set of multiple feedback indications via a first resource pool or a second resource pool, where the first resource pool may be a default resource pool and the second resource pool may be a capacity enhanced resource pool.

In some examples of the method, apparatuses, and non-transitory computer-readable medium described herein, the first resource pool and the second resource pool may be multiplexed across the bandwidth of the sidelink channel according to a frequency division multiplexing scheme, a time division multiplexing scheme, a code division multiplexing scheme, or any combination thereof.

In some examples of the method, apparatuses, and non-transitory computer-readable medium described herein, the indication may be received via a downlink control information message, a medium access control control element, or a radio resource control message.

A method for wireless communications at a first UE is described. The method may include transmitting, to at least a second UE, a sidelink message via a set of resource of a sidelink channel and receiving, from the second UE via a sidelink feedback channel, a set of multiple feedback indications associated with the sidelink message via one or more configurable resources in accordance with an interlace, the interlace indicating a set of multiple frequency resources including the one or more configurable resources, where the set of multiple frequency resources are uniformly distributed across a bandwidth of the sidelink feedback channel.

An apparatus for wireless communications at a first UE is described. The apparatus may include a processor, memory coupled with the processor, and instructions stored in the memory. The instructions may be executable by the processor to cause the apparatus to transmit, to at least a second UE, a sidelink message via a set of resource of a sidelink channel and receive, from the second UE via a sidelink feedback channel, a set of multiple feedback indications associated with the sidelink message via one or more configurable resources in accordance with an interlace, the interlace indicating a set of multiple frequency resources including the one or more configurable resources, where the set of multiple frequency resources are uniformly distributed across a bandwidth of the sidelink feedback channel.

Another apparatus for wireless communications at a first UE is described. The apparatus may include means for transmitting, to at least a second UE, a sidelink message via a set of resource of a sidelink channel and means for receiving, from the second UE via a sidelink feedback channel, a set of multiple feedback indications associated with the sidelink message via one or more configurable resources in accordance with an interlace, the interlace indicating a set of multiple frequency resources including the one or more configurable resources, where the set of multiple frequency resources are uniformly distributed across a bandwidth of the sidelink feedback channel.

A non-transitory computer-readable medium storing code for wireless communications at a first UE is described. The code may include instructions executable by a processor to transmit, to at least a second UE, a sidelink message via a set of resource of a sidelink channel and receive, from the second UE via a sidelink feedback channel, a set of multiple feedback indications associated with the sidelink message via one or more configurable resources in accordance with an interlace, the interlace indicating a set of multiple frequency resources including the one or more configurable resources, where the set of multiple frequency resources are uniformly distributed across a bandwidth of the sidelink feedback channel.

Some examples of the method, apparatuses, and non-transitory computer-readable medium described herein may further include operations, features, means, or instructions for receiving, at a first time, a first quantity of feedback indications via the one or more configurable resources at a first power and receiving, at a second time, a second quantity of feedback indications via the one or more configurable resources at a second power, where the first quantity may be less than the second quantity and the first power may be lower than the second power.

In some examples of the method, apparatuses, and non-transitory computer-readable medium described herein, receiving the set of multiple feedback indications may include operations, features, means, or instructions for receiving each feedback indication of the set of multiple feedback indications via a first cyclic shift pair of the set of multiple cyclic shift pairs of a respective frequency resource of the set of multiple frequency resources, where each frequency resource of the set of multiple frequency resources includes a set of multiple cyclic shift pairs corresponding to a set of multiple cyclic shift pair indices.

In some examples of the method, apparatuses, and non-transitory computer-readable medium described herein, receiving the set of multiple feedback indications via the one or more configurable resources may include operations, features, means, or instructions for receiving one or more dummy signals via a remaining quantity of frequency resources of the set of multiple frequency resources, where each dummy signal of the one or more dummy signals may be received via a second cyclic shift pair of a second set of multiple cyclic shift pairs associated with a respective frequency resource of the remaining quantity of frequency resources, where the second cyclic shift pair may be a first reserved cyclic shift pair for communicating dummy signals.

In some examples of the method, apparatuses, and non-transitory computer-readable medium described herein, a first cyclic shift pair index of the first reserved cyclic shift pair of the respective frequency resource may be offset from a second cyclic shift pair index of a second reserved cyclic shift pair of a subsequent frequency resource of the set of multiple frequency resources.

Some examples of the method, apparatuses, and non-transitory computer-readable medium described herein may further include operations, features, means, or instructions for transmitting a message including an indication of a quantity of feedback indications for the second UE to transmit, a pattern associated with the set of multiple frequency resources, or both, where receiving the set of multiple feedback indications may be based on transmitting the message.

In some examples of the method, apparatuses, and non-transitory computer-readable medium described herein, the sidelink channel includes a set of multiple interlaces and the set of multiple frequency resources may be associated with a first interlace of the set of multiple interlaces and the method, apparatuses, and non-transitory computer-readable medium may include further operations, features, means, or instructions for receiving the set of multiple feedback indications via the first interlace that may be different from a second interlace of the set of multiple interlaces, where the second interlace may be a common interlace.

Some examples of the method, apparatuses, and non-transitory computer-readable medium described herein may further include operations, features, means, or instructions for receiving a feedback indication of the set of multiple feedback indications, a dummy signal associated with a second interlace, or both, according to a power that may be below a threshold power based on a quantity of frequency resources between a first frequency resource of the one or more configurable resources for the feedback indication and a second frequency resource of the dummy signal exceeding a threshold quantity of frequency resources.

In some examples of the method, apparatuses, and non-transitory computer-readable medium described herein, the interlace includes a set of multiple interlaces and the set of multiple frequency resources may be associated with a first interlace of the set of multiple interlaces and the method, apparatuses, and non-transitory computer-readable medium may include further operations, features, means, or instructions for receiving the set of multiple feedback indications via the first interlace, a second interlace, or both, where the second interlace may be a common interlace.

Some examples of the method, apparatuses, and non-transitory computer-readable medium described herein may further include operations, features, means, or instructions for receiving the set of multiple feedback indications via a first subset of the set of multiple frequency resources, where the first subset includes the one or more configurable resources and receiving one or more dummy signals via remaining frequency resources of the first subset, via one or more frequency resources of a second subset of the set of multiple frequency resources, or both.

Some examples of the method, apparatuses, and non-transitory computer-readable medium described herein may further include operations, features, means, or instructions for transmitting an indication for the second UE to transmit the set of multiple feedback indications via a first resource pool or a second resource pool, where the first resource pool may be a default resource pool and the second resource pool may be a capacity enhanced resource pool.

In some examples of the method, apparatuses, and non-transitory computer-readable medium described herein, the first resource pool and the second resource pool may be multiplexed across the bandwidth of the sidelink channel according to a frequency division multiplexing scheme, a time division multiplexing scheme, a code division multiplexing scheme, or any combination thereof.

In some examples of the method, apparatuses, and non-transitory computer-readable medium described herein, the indication may be transmitted via a downlink control information message, a medium access control control element, or a radio resource control message.

DETAILED DESCRIPTION

Figure 1:
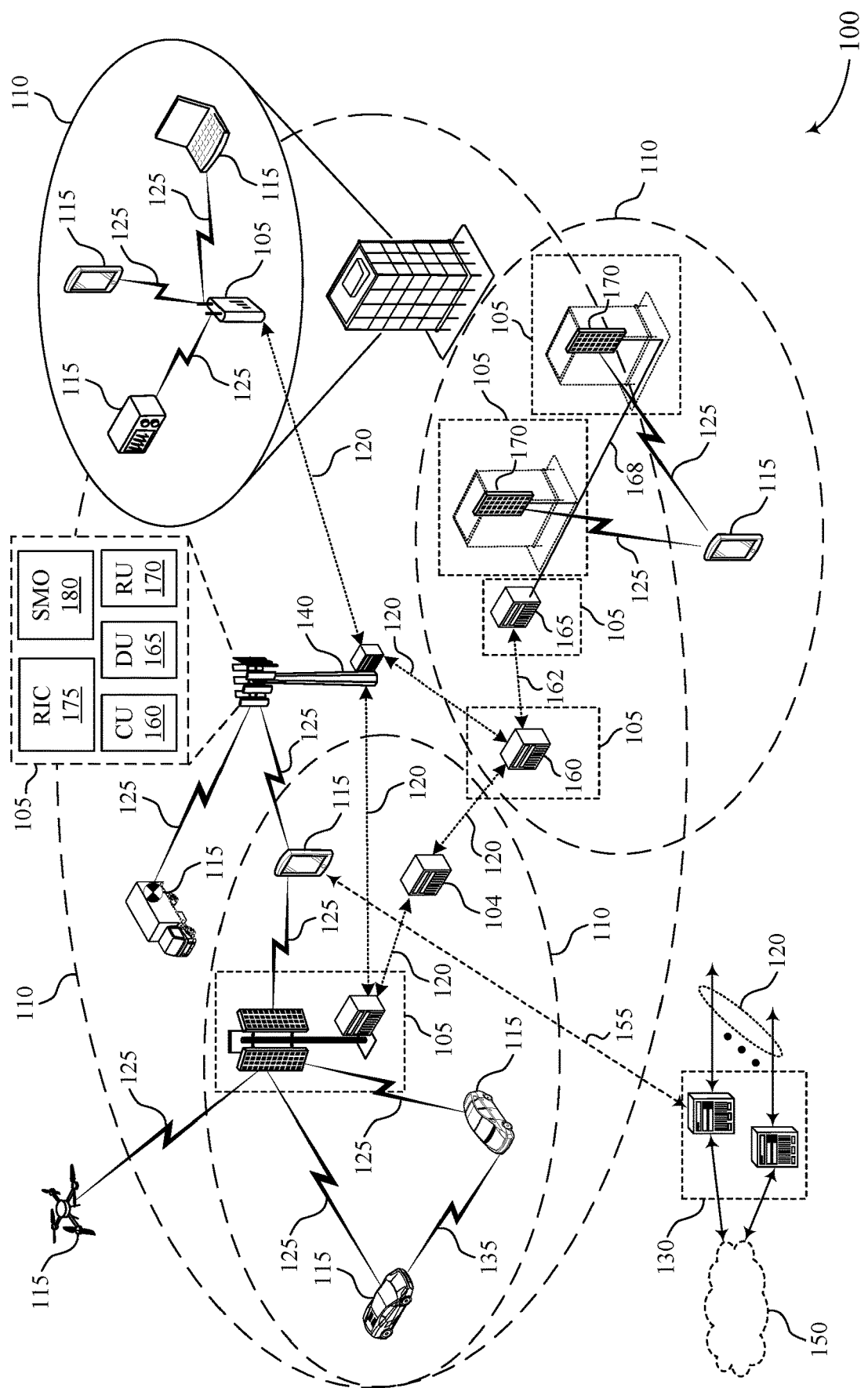
FIG. 1 illustrates an example of a wireless communications system that supports sidelink feedback for increased capacity in accordance with one or more aspects of the present disclosure.

In some wireless communications systems, multiple user equipments (UEs) may communicate directly with one another in a sidelink communications mode. For example, a transmitting sidelink UE may transmit data to one or more other sidelink UEs via a sidelink data channel (e.g., a physical sidelink shared channel (PSSCH) or a physical sidelink control channel (PSCCH)). Responsive to the data transmission, a receiving UE may transmit, via a sidelink feedback channel corresponding to the sidelink data channel (e.g., a physical sidelink feedback channel (PSFCH)), an indication of whether the data transmission was successfully received, such as a hybrid automatic repeat request (HARQ) acknowledgment (HARQ-ACK) or a HARQ-negative acknowledgment (HARQ-NACK). In some examples, frequency resources (e.g., a resource block (RB)) of the PSFCH may be divided into sets of resources based on a number of subchannels and a number of slots of a PSSCH associated with the PSFCH. Accordingly, a receiving UE may determine a PSFCH resource for transmitting feedback based on an identifier of the transmitting UE and an identifier of the receiving UE. However, such techniques may result in an occupied channel bandwidth (OCB) that does not satisfy an OCB threshold (e.g., 80% occupancy of PSFCH bandwidth). That is, a size of a feedback payload (e.g., 1 bit for feedback such as ACK or NACK) may result in a relatively small percentage of the PSFCH RBs being used for transmissions.

Alternatively, the PSFCH may be extended (e.g., to satisfy OCB constraints) using an interlaced waveform configuration. In such a configuration, one or more interlaces of interlaced RBs (IRBs) may be defined over the bandwidth of the PSFCH. An interlace of the one or more interlaces may include a quantity of IRBs (e.g., 10 IRBs) that are uniformly distributed through the bandwidth of the PSFCH. In some examples, such as when a relatively large quantity of receiving UEs are transmitting feedback information via the PSFCH, the receiving UEs may identify one or more common resources (e.g., a common interlace), one or more dedicated resources, or both for transmitting feedback. For example, the receiving UEs may each transmit feedback via IRBs of a first interlace (e.g., concurrently) and may additionally transmit feedback via a dedicated PRB. Additionally, or alternatively, the receiving UEs may transmit feedback via one IRB of an interlace and may transmit a dummy signal (e.g., non-useful information, known information) via the remaining IRBs (e.g., where another UE may be transmitting). In some cases, however, such methods may cause an irregular PSFCH waveform, may result in limited transmission power for the feedback transmissions, may be sensitive to devices transmitting in close proximity, or any combination thereof.

To enhance interlaced PSFCH transmissions, a UE may transmit feedback information via a configurable quantity of IRBs in one or more interlaces. For example, the UE may be configured to transmit feedback via multiple IRBs of an interlace, which may increase an allowable transmission power for the feedback transmission. In such an example, the UE may determine which IRBs to use in accordance with a configuration, which may indicate a quantity of IRBs, a distribution of the IRBs (e.g., distributed across the interlace or contiguous within the interlace), a pattern of the IRBs, or any combination thereof. Additionally, or alternatively, the UE may determine to transmit feedback via multiple IRBs of an interlace that is different from a common interlace. That is, the UE may transmit feedback via IRBs of a first interlace that are offset from IRBs of a common interlace, which may improve transmission power for the feedback information. In some cases, the UE may reduce a transmission power for a common IRB, a feedback carrying IRB, or both, to avoid exceeding a power spectral density (PSD) limit.

Aspects of the disclosure are initially described in the context of wireless communications systems. Aspects of the disclosure are further illustrated by and described with reference to interlacing configurations, interlacing RB configurations, and process flows. Aspects of the disclosure are further illustrated by and described with reference to apparatus diagrams, system diagrams, and flowcharts that relate to sidelink feedback for increased capacity.

FIG. 1 illustrates an example of a wireless communications system 100 that supports sidelink feedback for increased capacity in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support sidelink feedback for increased capacity as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., N f) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

As described herein, a UE 115 may support an interlacing PSFCH design for transmitting sidelink feedback information. The interlacing PSFCH design may include a configuration of one or more interlaces in the PSFCH. In some examples, a UE 115 may transmit feedback indications (e.g., ACK or NACK) via one or more (e.g., configured, dynamic, or configurable) IRBs of an interlace. For example, the UE 115 may occupy a first interlace of the PSFCH and may transmit a feedback indication via two or more IRBs of the interlace. Further, the IRBs used by the UE 115 may be configurable (e.g., via RRC signaling). That is, a network entity 105 may configure the UE 115 with a quantity of IRBs, a distribution of IRBs, a pattern of IRBs, or any combination thereof, for transmitting feedback indications via the interlace. Additionally, or alternatively, the UE 115 may determine to transmit feedback via multiple IRBs of an interlace that is different from a common interlace. That is, the UE 115 may transmit feedback via IRBs of a first interlace that are offset from IRBs of a common interlace, which may improve transmission power for the feedback information. In some cases, the UE 115 may reduce a transmission power for a common IRB, a feedback carrying IRB, or both, to avoid exceeding a power spectral density (PSD) limit. In some examples, the UE 115 may determine a multiplexing configuration for the PSFCH, such as when the PSFCH supports a capacity enhanced PSFCH format-0 (PF0).

Figure 2:
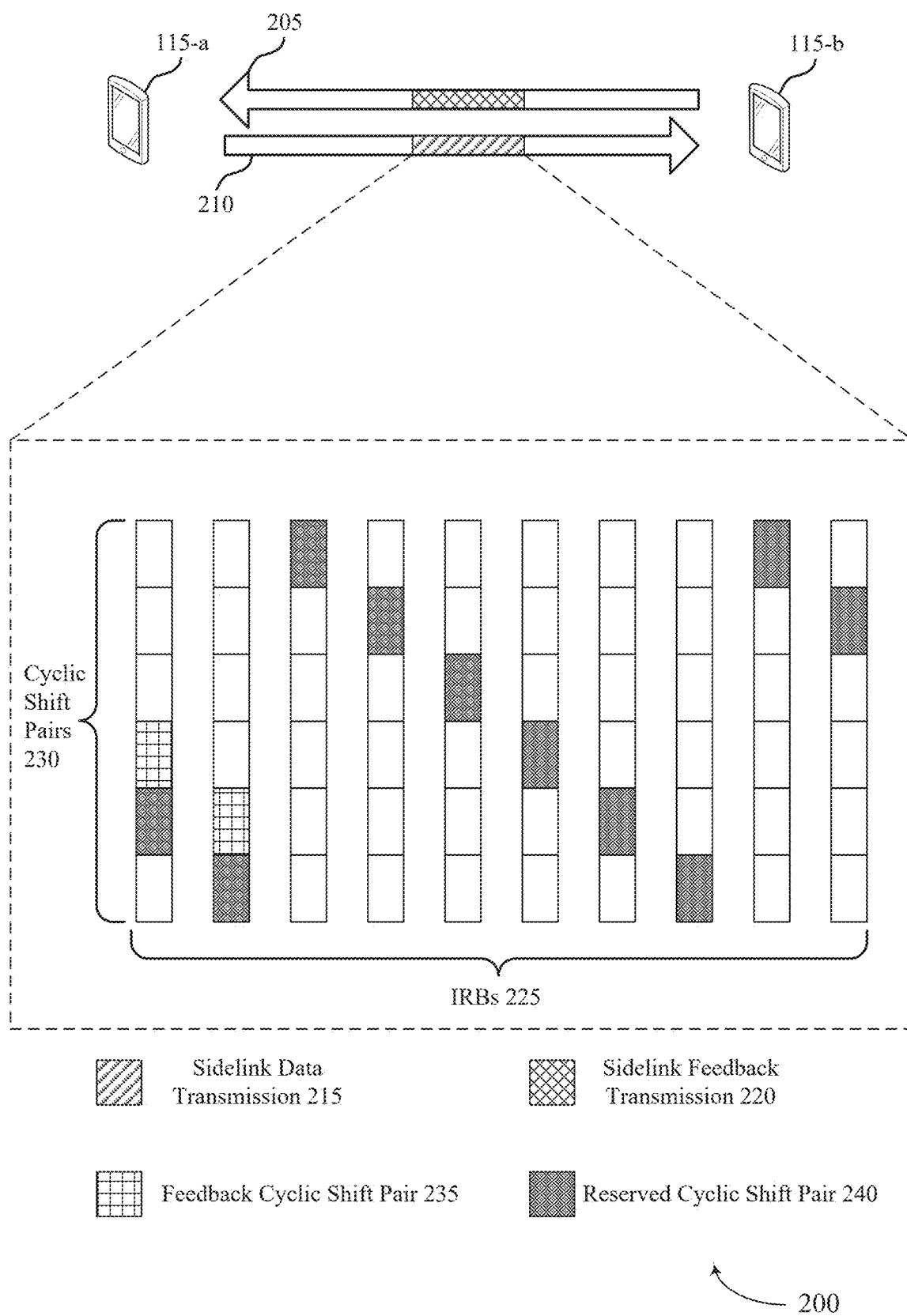
FIG. 2 illustrates an example of a wireless communications system that supports sidelink feedback for increased capacity in accordance with one or more aspects of the present disclosure.

FIG. 2 illustrates an example of a wireless communications system 200 that supports sidelink feedback for increased capacity in accordance with one or more aspects of the present disclosure. The wireless communications system 200 may include one or more aspects of the wireless communications system 100. For example, the wireless communications system 200 may include a UE 115-a and a UE 115-b, which may each be examples of a UE 115 as described with reference to FIG. 1. In some cases, the wireless communications system 200 may illustrate an interlaced PSFCH configuration for transmitting feedback information from the UE 115-a to the UE 115-b, such as a HARQ-ACK or a HARQ-NACK.

In some examples, the UE 115-a and the UE 115-b may communicate according to a sidelink configuration (e.g., perform communications independent of a network entity 105). That is, the UE 115-b may transmit a sidelink data transmission 215 via a sidelink data channel 205 (e.g., PSSCH or PSCCH), and the UE 115-a may transmit a sidelink feedback transmission 220 via a sidelink feedback channel 210 (e.g., PSFCH). In some cases, the sidelink data channel 205 and the sidelink feedback channel 210 may be examples of a same bandwidth at different symbols of a sidelink slot. In some cases, the sidelink feedback transmission 220 may be performed according to an interlacing configuration of the sidelink feedback channel 210. The interlacing configuration may indicate one or more interlaces associated with the sidelink feedback channel 210. For example, the UE 115-a may transmit a feedback indication via an interlace including one or more IRBs 225, which may be uniformly distributed across the channel bandwidth. That is, a first IRB and a second IRB of the IRBs 225 may be offset by one or more RBs of the PSFCH (e.g., non-contiguous in frequency). Such interlacing may support an extended PSFCH waveform to satisfy OCB constraints (e.g., 60%, 75%, 80% OCB), but may limit a capacity of the PSFCH (e.g., a quantity of UEs 115 transmitting feedback via the PSFCH).

Accordingly, the UE 115-*a* may occupy IRBs of a common interlace (e.g., used by multiple sidelink UEs 115) and may transmit feedback via one or more dedicated RBs (e.g., a static configuration). For example, the UE 115-*a* may transmit a feedback indication via a dedicated RB of the PSFCH (e.g., an IRB of the common interlace or a different RB) and may transmit a dummy signal (e.g., irrelevant information, known information or sequence, predefined signal) via IRBs of the common interlace to satisfy OCB constraints. In some cases, one or more other sidelink UEs 115 may transmit respective feedback indications using similar techniques. However, transmitting feedback via a dedicated RB may cause an irregular PSFCH waveform, may limit coverage (e.g., transmission power), and may cause proximity sensitivity at the UE 115-*a* (e.g., due to other nearby sidelink UEs 115 transmitting dummy signals via the dedicated RB).

To support enhanced feedback communications in an interlacing PSFCH configuration, the UE 115-*a* may be dynamically configured to transmit one or more feedback indications via one or more IRBs of the PSFCH. That is, the UE 115-*a* may receive a message (e.g., a control message such as a downlink control information (DCI) message, a MAC-CE, an RRC message, etc.) that indicates a configuration of the one or more RBs for repeated transmission of a feedback indication. In some cases, the configuration may include a quantity of IRBs of an interlace (e.g., a single IRB of the interlace, each IRB of the interlace, or any quantity in between) a distribution of the IRBs, a pattern of the IRBs, or any combination thereof. Further, an RB of the PSFCH may include a set of cyclic shift pairs 230 which may include one or more feedback cyclic shift pairs 235, one or more reserved cyclic shift pairs 240, or both. In some cases, the UE 115-*a* may transmit a feedback indication via a feedback cyclic shift pair 235 associated with IRBs indicated by the configuration and may transmit a dummy signal via the reserved cyclic shift pair 240 associated with remaining IRBs of the interlace.

In some examples, an allowable transmit power of the UE 115-*a* may be associated with the quantity of feedback indications transmitted by the UE 115-*a* in an interlace. For example, a first quantity of feedback indications (e.g., one feedback indication) may correspond to a first allowable transmit power for the UE 115-*a* (e.g., 10 dBm), and a second quantity of feedback indications (e.g., two feedback indications) may correspond to a second allowable transmit power for the UE 115-*a* (e.g., 13 dBm). In other words, transmitting a larger quantity of feedback indications within an interlace may support a higher transmit power which does not exceed a PSD limit of the PSFCH. Additionally, transmitting a larger quantity of feedback indications within the interlace may increase a robustness of the sidelink feedback transmission 220 (i.e., reduce the likelihood a feedback indication is disturbed by dummy signals transmitted on a same IRB by nearby UEs).

The UE 115-*a* may determine which IRBs of an interlace via which to transmit feedback indications using a distribution associated with the interlace, a pattern associated with an RB of the PSFCH, or both. For example, the configuration may indicate that the quantity of IRBs for feedback indications are to be evenly distributed across the interlace, which may support a greater frequency diversity. Alternatively, the configuration may indicate that the quantity of IRBs for feedback indications are to be contiguous within the interlace, which may support various configurations of IRBs (e.g., different configurable quantities of IRBs available or configured for feedback). In some cases, an RB of the PSFCH may be configured by one or more parameters associated with the distribution of IRBs for an interlace. That is, the UE 115-*a* may be identify an RB which indicates an interlace index, a starting IRB, and a quantity of IRBs (e.g., for a contiguous IRB pattern), and may also include an IRB gap (e.g., for a distributed IRB pattern). In some cases, the RBs configured by the one or more parameters may be contiguous in frequency (e.g., a contiguous bandwidth including the RBs), or may be configured per RB.

In some examples, an interlace of the PSFCH may be configured according to cyclic shift ramping to reduce a peak to average power ratio (PAPR) of the sidelink feedback transmission 220. For example, the IRBs 225 of an interlace may each include the reserved cyclic shift pair 240 at a cyclic shift pair index that is offset from a subsequent IRB 225 (e.g., an offset of one cyclic shift pair index). In some examples, the cyclic shift ramping may be common such that each interlace of the PSFCH applies the cyclic shift ramping. In such an example, a network entity 105 may share the common cyclic shift ramping with one or more sidelink UEs 115, which may prevent or reduce a feedback cyclic shift pair 235 of an IRB colliding with a reserved cyclic shift pair 240 of the IRB associated with a different communications link.

Additionally, or alternatively, the UE 115-*a* may be configured to transmit feedback information via a partial interlace (e.g., instead of a full interlace occupying a 20 MHz sub band). The partial interlace may include a subset of IRBs of an interlace, where the subset of IRBs may be determined based on an IRB index of the IRBs of the subset of IRBs. For example, an interlace may include ten IRBs (e.g., IRB0 through IRB9), and the UE 115-*a* may identify a partial interlace corresponding to even-indexed IRBs (e.g., IRB0, IRB2, IRB4, IRB6, and IRB8), may identify a partial interlace corresponding to odd-indexed IRBs (e.g., IRB1, IRB3, IRB5, IRB7, and IRB9), or both. In some examples, UE 115-*a* may then transmit one or more feedback indications and dummy signals via one or more partial interfaces (e.g., according to the configured IRBs). In one such example, the UE 115-*a* may transmit feedback indications via one or more IRBs of a partial interlace (e.g., IRB0 and IRB2) and may transmit dummy signals via remaining IRBs of the partial interlace (e.g., IRB4, IRB6, and IRB8). In another example, the UE 115-*a* may transmit feedback indications via one or more IRBs of a first partial interlace (e.g., IRB0 and IRB2) and may transmit dummy signals via IRBs of a second partial interlace (e.g., IRB1, IRB3, IRB5 and IRB7). Further, a partial interlace may be configured to support cyclic shift ramping as described herein. In some cases, transmitting via a partial interlace may support an increased capacity of the PSFCH (e.g., allow for a larger quantity of UEs 115 to transmit).

Figure 3:
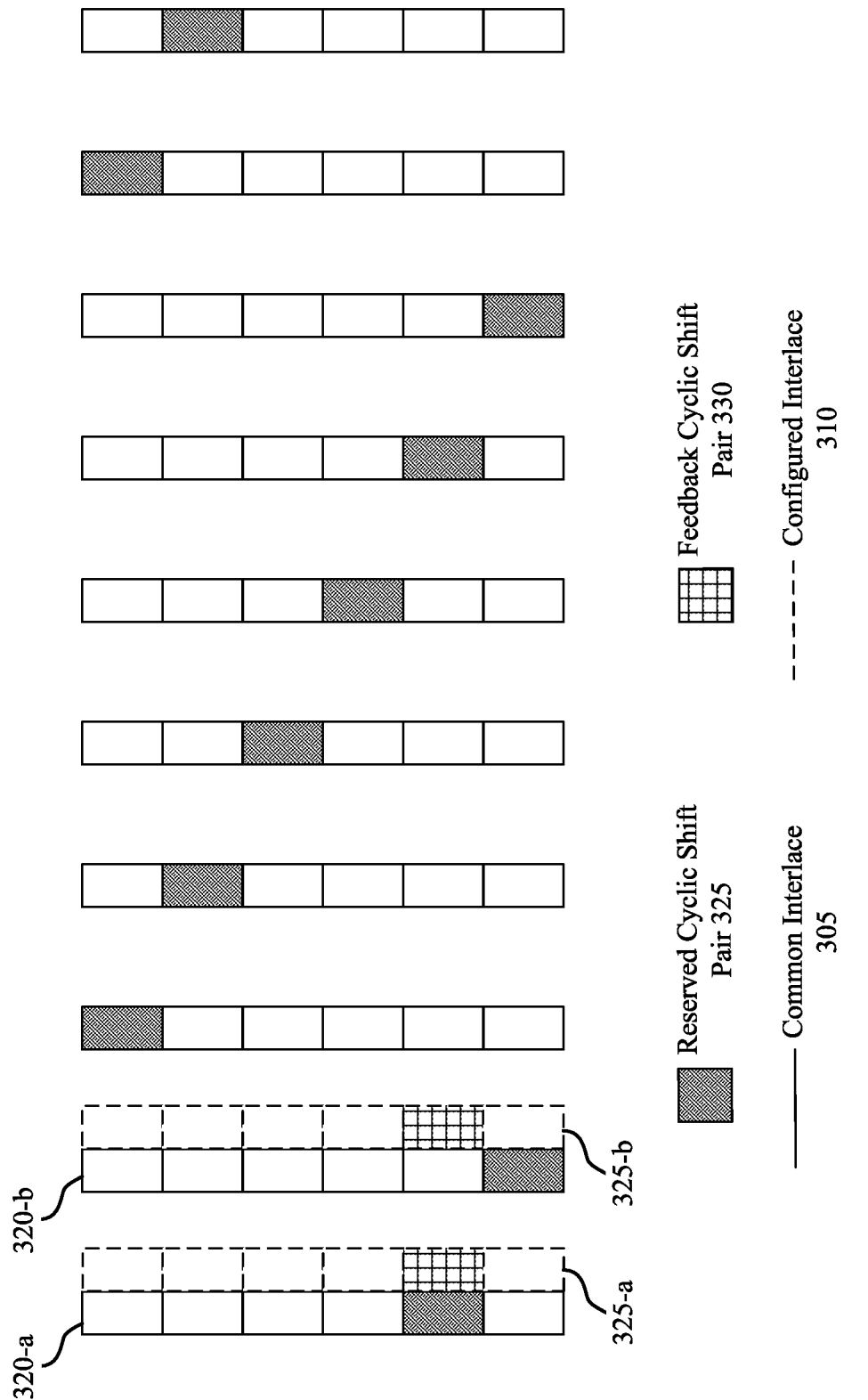
FIG. 3 illustrates an example of an interlacing configuration that supports sidelink feedback for increased capacity in accordance with one or more aspects of the present disclosure.

FIG. 3 illustrates an example of an interlacing configuration 300 that supports sidelink feedback for increased capacity in accordance with one or more aspects of the present disclosure. The interlacing configuration 300 may implement one or more aspects of the wireless communications system 200. For example, the interlacing configuration 300 may be an example of interlaced IRBs included in a PSFCH bandwidth, as described with reference to FIG. 2. In some examples, the interlacing configuration 300 may illustrate a common interlace 305 (e.g., interlace #0 including IRB 320-*a* and IRB 320-*b*) and a configured interlace 310 (e.g., interlace #1 including IRB 325-*a* and IRB 325-*b*), which may be used by a UE 115 for transmitting feedback indications in response to a sidelink transmission, transmitting dummy signals to satisfy OCB constraints, or both.

In some examples, one or more sidelink UEs 115 may transmit via the common interlace 305 and one or more IRBs of a different interlace. In such an example, a UE 115 may transmit dummy signals via IRBs the common interlace 305 and may transmit a configurable quantity of feedback indications via IRBs of the configured interlace 310. In some cases, the UE 115 may be configured (e.g., indicated via a control signal such as RRC) with the quantity of feedback indications and a distribution pattern of the feedback indications within the configured interlace as described with reference to FIG. 2. Additionally, to support reducing a PAPR for the sidelink transmission, the UE 115 may identify a cyclic shift ramping configuration for the common interlace 305, the configured interlace 310, or both, as described with reference to FIG. 2.

In some cases, the UE 115 may configure a transmit power for a dummy signal and a feedback indication that are transmitted relatively close in frequency. For example, the UE 115 may transmit a dummy signal via a reserved cyclic pair 325 of an IRB 320-a and via a reserved cyclic pair 325 of an IRB 320-b, which may be included in the common interlace 305. The UE 115 may also transmit one or more feedback indications (e.g., in accordance with an interlacing configuration) via a feedback cyclic shift pair 330 of an IRB 325-a and via a feedback cyclic shift pair 330 of an IRB 325-b, which may be included in the configured interlace 310. In some cases, the common interlace 305 and the configured interlace 310 may have a similar distribution across the PSFCH bandwidth with an RB offset between IRBs of each interlace. Further, the UE 115 may exceed a PSD limit (e.g., 10 dBm/MHz) due to transmitting a dummy signal and a feedback indication via IRBs relatively close in frequency (e.g., a one RB offset). In such cases, the UE 115 may adjust a transmit power for the feedback indication, the dummy signal, or both, upon identifying that a first IRB for the feedback indication and a second IRB for the dummy signal are within a threshold quantity of RBs from each other (e.g., N RBs). For example, the UE 115 may modify a transmit power for the dummy signal (e.g., reduce power or drop transmission), may modify the transmit power for the feedback indication (e.g., reduce power), or both.

In some examples, the UE 115 may be configured to transmit feedback signals, dummy signals, or both via each of the common interlace 305 and the configured interlace 310. That is, the UE 115 may transmit dummy signals via one or more IRBs of the common interlace 305 (e.g., using a respective reserved cyclic shift pair 325) and may transmit the configurable quantity of feedback indications via one or more IRBs of the common interlace 305, the configured interlace 310, or both (e.g., selecting a feedback cyclic shift pair 330). In some cases, such as when the UE 115 transmits feedback indications via the common interlace 305, the UE 115 may transmit a feedback indication of the quantity of feedback indications via a cyclic shift pair of an IRB that is different from the reserved cyclic shift pair 325 (e.g., to avoid collisions with other UEs 115 transmitting dummy signals to fulfill OCB constraints). Alternatively, such as when the UE 115 transmits feedback via the configured interlace 310, the UE 115 may transmit a feedback indication of the quantity of feedback indications via an available cyclic shift pair of an IRB. In other words, the UE 115 may select a cyclic shift pair for transmission of feedback via the configured interlace 310 based on cyclic shift pairs used by other UEs 115, rather than a reserved cyclic shift pair 325. Additionally, the quantity, pattern (e.g., contiguous or distributed within an interlace), or both of IRBs used for feedback indications, and a cyclic shift ramping (e.g., to mitigate PAPR) associated with the common interlace 305, the configured interlace 310, or both may be configured using techniques as described with reference to FIG. 2.

Figure 4:
FIG. 4 illustrates an example of an interlacing resource block configuration that supports sidelink feedback for increased capacity in accordance with one or more aspects of the present disclosure.
Figure 4:
Figure 4:
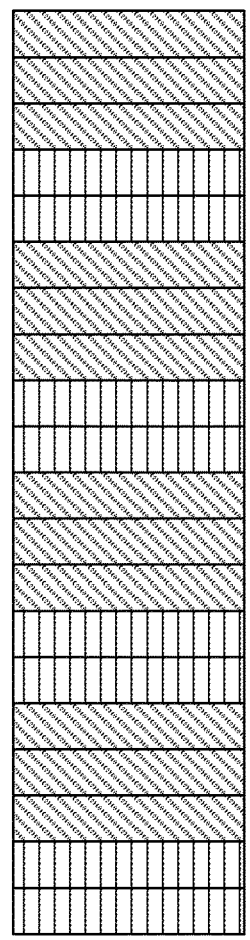
Figure 4:
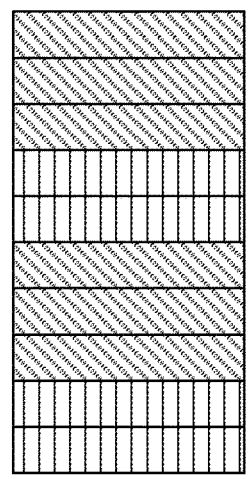

FIG. 4 illustrates an example of an interlacing resource block configuration 400 that supports sidelink feedback for increased capacity in accordance with one or more aspects of the present disclosure. The interlacing RB configuration 400 may be implemented by one or more aspects of the wireless communications system 200. For example, the interlacing RB configuration 400 may be an example of one or more interlaces included a PSFCH bandwidth, as described with reference to FIG. 2. The interlacing RB configuration 400 may illustrate an RB set 405, which may be an example of a PSFCH bandwidth including a quantity of RBs (e.g., 50 RBs). Additionally, each RB of the RB set 405 may be associated with a regular PF0 410 or an enhanced PF0 415 (e.g., a capacity enhanced waveform), which may correspond to different configured resource pools of the PSFCH bandwidth.

In some examples, a UE 115 may transmit feedback via a regular PF0 410 waveform or an enhanced PF0 415 waveform. In such examples, the UE 115 may identify a configuration of a first resource pool of RBs associated with regular PF0B 410 and a second resource pool of RBs associated with enhanced PF0B 415 (e.g., a hard partitioning of resource pools). Additionally, or alternatively, the UE 115 may identify a multiplexing configuration of the regular PF0 410 and the enhanced PF0 415 in the RB set 405.

In a first example, the regular PF0 410 and the enhanced PF0 415 may be multiplexed according to a frequency division multiplexing (FDM) scheme. The UE 115 may assign the regular PF0 410 and the enhanced PF0 415 to different interlaces of the RB set 405. For example, if the RB set 405 includes five interlaces, a first quantity of the interlaces (e.g., interlace #0 and interlace #1) may include IRBs associated with the regular PF0 410 and a remaining quantity of interlaces (e.g., interlace #1, interlace #2, and interlace #3) may include IRBs associated with the enhanced PF0 415. By applying such a multiplexing configuration, an IRB carrying a feedback indication (e.g., an enhanced PF0 415 IRB) may avoid collisions with IRBs associated with a different waveform (e.g., regular PF0 410 IRBs).

In a second example, the regular PF0 410 and the enhanced PF0 415 may be multiplexed according to a time division multiplexing (TDM) scheme. In such an example, the UE 115 may assign the regular PF0 410 and the enhanced PF0 415 to different instances of the RB set 405 in time. For example, the UE 115 may transmit a waveform according to the regular PF0 410 for each RB of the RB set 405 at a first PSFCH symbol (e.g., a first time) and may transmit a waveform according to the enhanced PF0 415 for each RB of the RB set 405 at a second PSFCH symbol (e.g., a second time).

In a third example, the regular PF0 410 and the enhanced PF0 415 may be multiplexed according to a cyclic division multiplexing (CDM) scheme. In such an example, the UE 115 may assign the regular PF0 410 and the enhanced PF0 415 to different cyclic shift pair indices of RBs of the RB set 405. That is, the UE 115 may designate a first quantity of cyclic shift pairs of an RB to use for a regular PF0 410 and may designate a second quantity of cyclic shift pairs of an RB to use for an enhanced PF0 415.

In some cases, a transmitting UE 115 (e.g., transmitting sidelink data) may indicate a resource pool of the PSFCH for one or more receiving UEs 115 to transmit sidelink feedback (e.g., responsive to the sidelink data). For example, the transmitting UE 115 may transmit a control message (e.g., a sidelink control information (SCI) message, an explicit indication in SCI-2) indicating the resource pool for the receiving UE 115. Alternatively, the resource pool may be configured per-link or may depend on a type of transmissions for a link. For example, a receiving UE 115 may determine to use a resource pool associated with the enhanced PF0 415 based on identifying a groupcast message (e.g., supported by the enhanced PF0 415). In another example, the resource pool may be configured via higher-layer signaling (e.g., PC-5 RRC) per link associated with the PSFCH.

Figure 5:
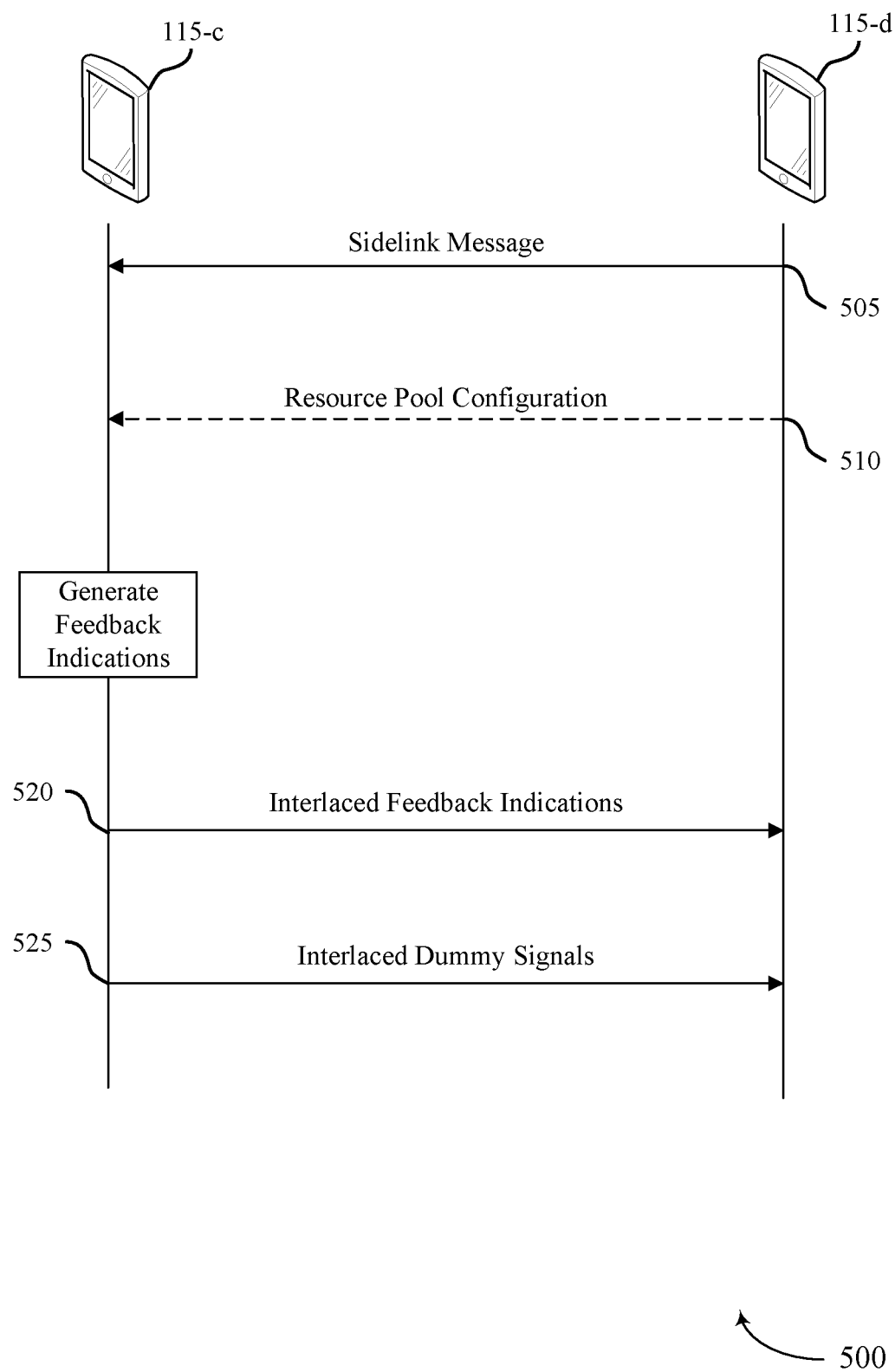
FIG. 5 illustrates an example of a process flow that supports sidelink feedback for increased capacity in accordance with one or more aspects of the present disclosure.

FIG. 5 illustrates an example of a process flow 500 that supports sidelink feedback for increased capacity in accordance with one or more aspects of the present disclosure. The process flow 500 may implement aspects of the wireless communications system 100 and the wireless communications system 200. For example, the process flow 500 may be implemented by a UE 115-*c* and a UE 115-*d*, which may be examples of sidelink UE 115-*a* and sidelink UE 115-*b*, as described with reference to FIG. 2. The process flow 500 may illustrate the UE 115-*c* transmitting feedback indications and dummy signals via IRBs of a PSFCH bandwidth.

At 505, the UE 115-*d* may transmit a sidelink message to the UE 115-*c*. The sidelink message may be transmitted via a sidelink channel, such as a PSCCH or a PSSCH. In some examples, the sidelink message may indicate that the UE 115-*c* is to transmit feedback to indicate whether the sidelink message was successfully received.

At 510, the UE 115-*d* may transmit a resource pool configuration to the UE 115-*c*. In some cases, the resource pool configuration may indicate one or more resource pools associated with one or more waveforms of the PSFCH, such as a regular PF0 waveform and a capacity enhanced PF0 waveform. Additionally, or alternatively, the configuration may indicate a multiplexing scheme associated with the one or more resource pools, such as TDM, FDM, CDM, or any combination thereof.

At 515, the UE 115-*c* may generate one or more feedback indications. For example, the UE 115-*c* may be configured with a quantity of feedback indications to transmit, a pattern of IRBs within an interlace via which to transmit the one or more feedback indications, or both. In some cases, the UE 115-*c* may receive the configuration via RRC signaling or via control signaling (e.g., SCI).

At 520, the UE 115-*c* may transmit interlaced feedback indications. For example, the UE 115-*c* may transmit the configurable quantity of feedback indications via one or more configurable IRBs of an interlace. In some cases, the UE 115-*c* may transmit the configurable quantity of feedback indications via a configured interlace, a common interlace, or both associated with the PSFCH. Further, the UE 115-*c* may transmit the configurable quantity of feedback indications via a cyclic shift pair of a respective IRB. In some examples, an IRB may include a reserved cyclic shift pair for transmission of dummy signals (e.g., to satisfy OCB constraints), and a cyclic shift pair index of a first reserved cyclic shift pair of an IRB may be offset from a cyclic shift pair index of a second reserved cyclic shift pair of a subsequent IRB of an interlace (e.g., cyclic shift ramping). Additionally, or alternatively, the UE 115-*c* may transmit feedback indications via a subset of IRBs of an interlace (e.g., a partial interlace), and may transmit dummy signals via remaining IRBs of the subset of IRBs, or remaining IRBs of the interlace.

At 525, the UE 115-*c* may transmit interlaced dummy signals to the UE 115-*d*. For example, the UE 115-*c* may be configured to transmit one or more dummy signals via IRBs of a common interlace to support OCB constraints. Further, the UE 115-*c* may transmit the dummy signals via a reserved cyclic shift pair of each IRB of the common interlace. In some examples, the UE 115-*c* may refrain from transmitting a dummy signal via an IRB configured for a feedback indication from the UE 115-*c*. Additionally, the UE 115-*c* may reduce the transmit power of a feedback indication, may reduce the transmit power or drop a transmission of a dummy signal, or both, to avoid exceed a PSD limit when an IRB for the dummy signal (e.g., an IRB of the common interlace) and an IRB for the feedback indication (e.g., an IRB of the configured interlace are within a threshold quantity of RBs of each other.

Figure 6:
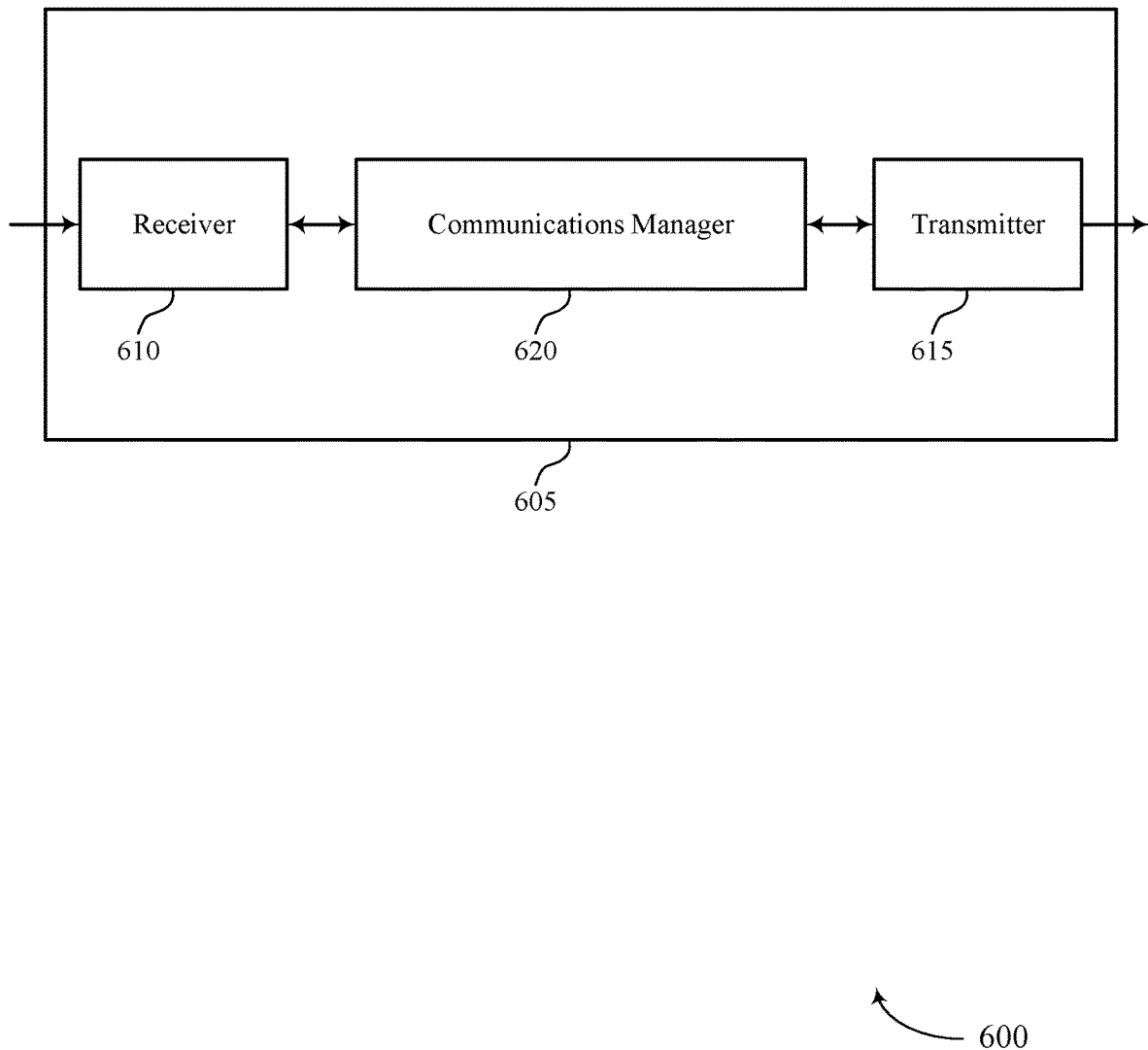
FIGS. 6 and 7 show block diagrams of devices that support sidelink feedback for increased capacity in accordance with one or more aspects of the present disclosure.

FIG. 6 shows a block diagram 600 of a device 605 that supports sidelink feedback for increased capacity in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to sidelink feedback for increased capacity). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to sidelink feedback for increased capacity). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of sidelink feedback for increased capacity as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a first UE in accordance with examples as disclosed herein. For example, the communications manager 620 may be configured as or otherwise support a means for receiving, from a second UE, a sidelink message via a set of resources of a sidelink channel. The communications manager 620 may be configured as or otherwise support a means for generating, based at least on the sidelink message, a set of multiple feedback indications. The communications manager 620 may be configured as or otherwise support a means for transmitting, via a sidelink feedback channel to the second UE and in accordance with an interlace, the set of multiple feedback indications via one or more configurable resources, the interlace indicating a set of multiple frequency resources including the one or more configurable resources, where the set of multiple frequency resources are uniformly distributed across a bandwidth of the sidelink feedback channel.

Additionally, or alternatively, the communications manager 620 may support wireless communications at a first UE in accordance with examples as disclosed herein. For example, the communications manager 620 may be configured as or otherwise support a means for transmitting, to at least a second UE, a sidelink message via a set of resource of a sidelink channel. The communications manager 620 may be configured as or otherwise support a means for receiving, from the second UE via a sidelink feedback channel, a set of multiple feedback indications associated with the sidelink message via one or more configurable resources in accordance with an interlace, the interlace indicating a set of multiple frequency resources including the one or more configurable resources, where the set of multiple frequency resources are uniformly distributed across a bandwidth of the sidelink feedback channel.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for enhancing sidelink feedbacking indications, which may improve the reliability of sidelink communications and thus improve device power consumption and user experience.

Figure 7:
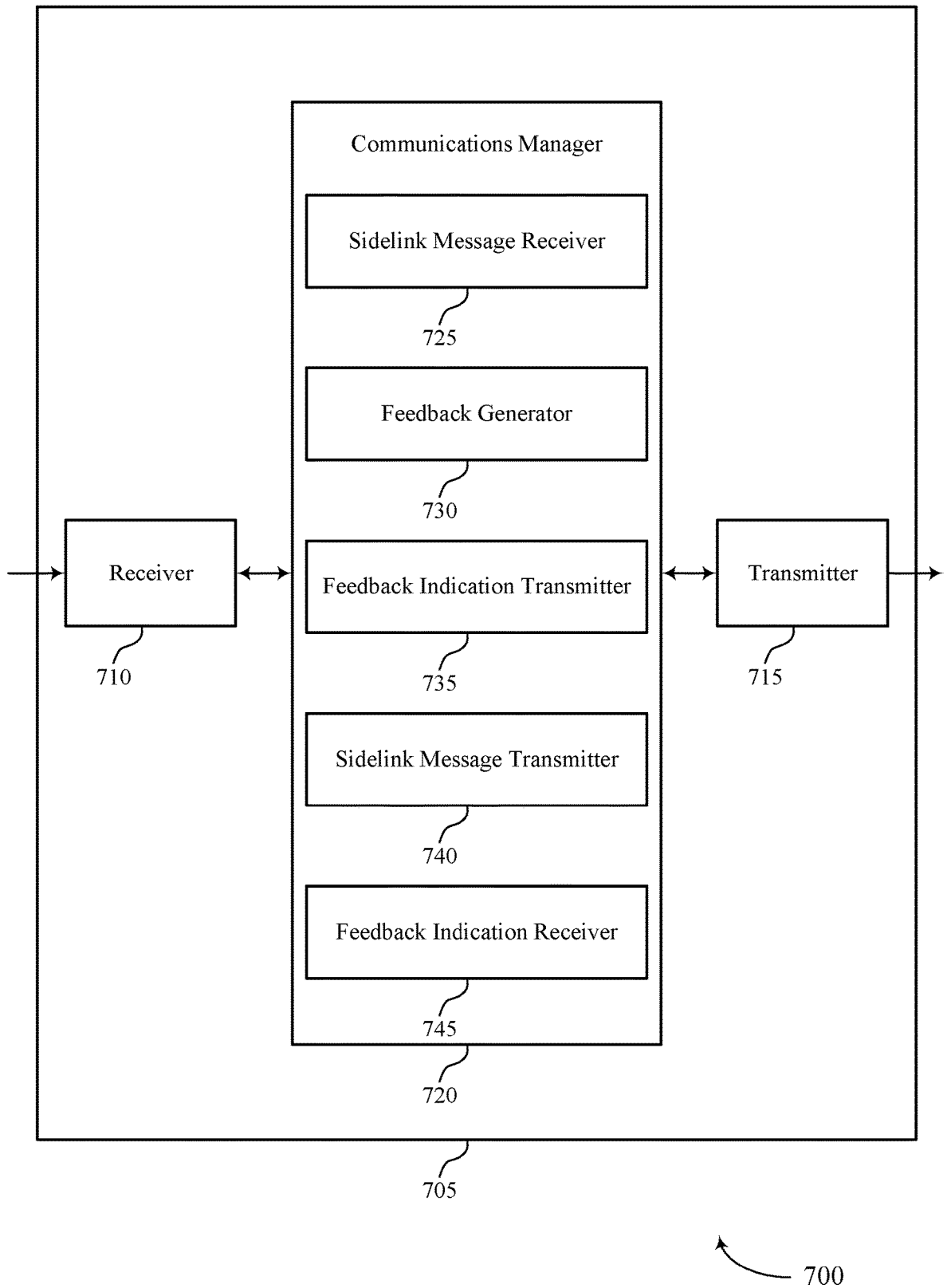

FIG. 7 shows a block diagram 700 of a device 705 that supports sidelink feedback for increased capacity in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to sidelink feedback for increased capacity). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to sidelink feedback for increased capacity). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of sidelink feedback for increased capacity as described herein. For example, the communications manager 720 may include a sidelink message receiver 725, a feedback generator 730, a feedback indication transmitter 735, a sidelink message transmitter 740, a feedback indication receiver 745, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a first UE in accordance with examples as disclosed herein. The sidelink message receiver 725 may be configured as or otherwise support a means for receiving, from a second UE, a sidelink message via a set of resources of a sidelink channel. The feedback generator 730 may be configured as or otherwise support a means for generating, based at least on the sidelink message, a set of multiple feedback indications. The feedback indication transmitter 735 may be configured as or otherwise support a means for transmitting, via a sidelink feedback channel to the second UE and in accordance with an interlace, the set of multiple feedback indications via one or more configurable resources, the interlace indicating a set of multiple frequency resources including the one or more configurable resources, where the set of multiple frequency resources are uniformly distributed across a bandwidth of the sidelink feedback channel.

Additionally, or alternatively, the communications manager 720 may support wireless communications at a first UE in accordance with examples as disclosed herein. The sidelink message transmitter 740 may be configured as or otherwise support a means for transmitting, to at least a second UE, a sidelink message via a set of resource of a sidelink channel. The feedback indication receiver 745 may be configured as or otherwise support a means for receiving, from the second UE via a sidelink feedback channel, a set of multiple feedback indications associated with the sidelink message via one or more configurable resources in accordance with an interlace, the interlace indicating a set of multiple frequency resources including the one or more configurable resources, where the set of multiple frequency resources are uniformly distributed across a bandwidth of the sidelink feedback channel.

Figure 8:
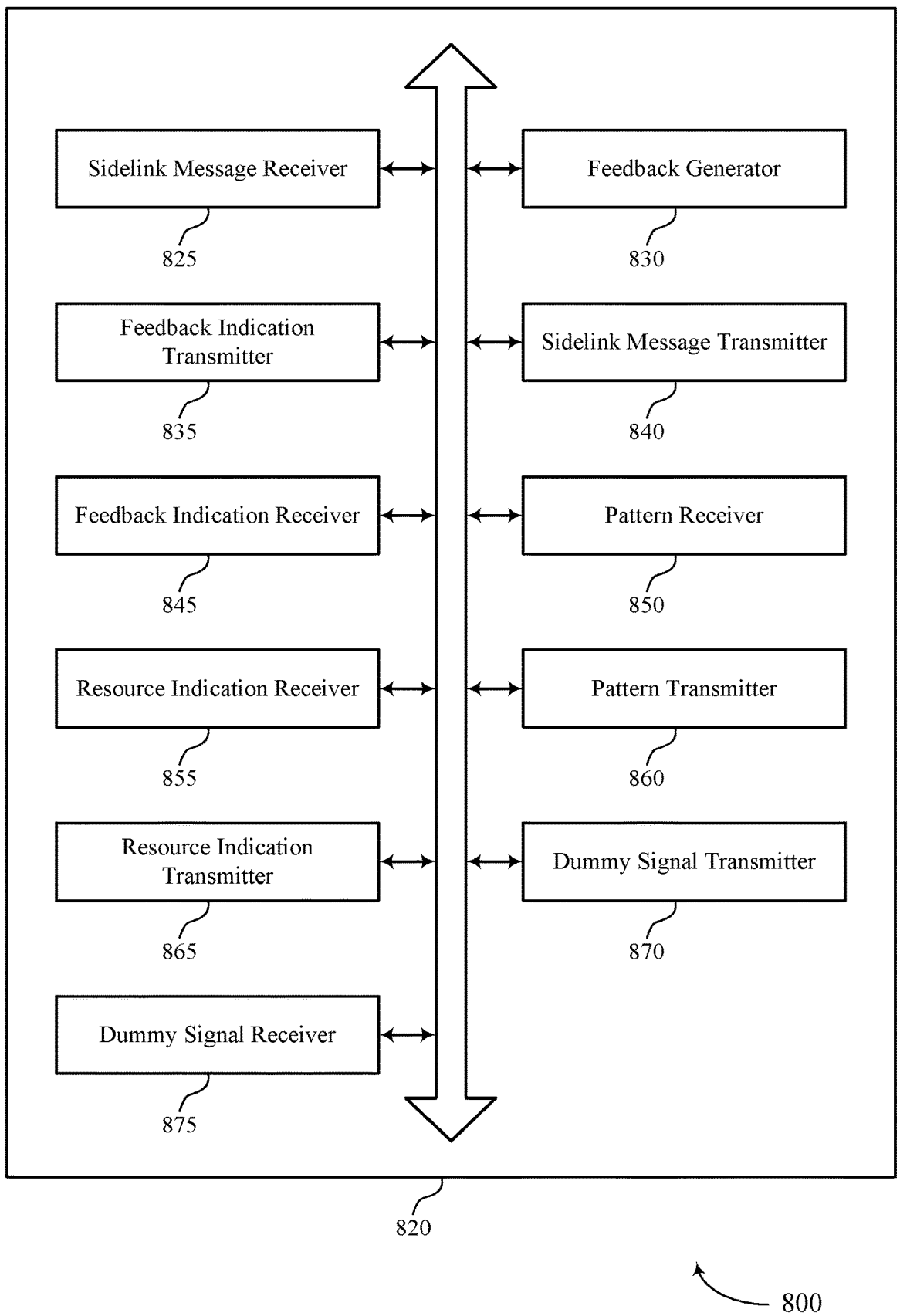
FIG. 8 shows a block diagram of a communications manager that supports sidelink feedback for increased capacity in accordance with one or more aspects of the present disclosure.

FIG. 8 shows a block diagram 800 of a communications manager 820 that supports sidelink feedback for increased capacity in accordance with one or more aspects of the present disclosure. The communications manager 820 may be an example of aspects of a communications manager 620, a communications manager 720, or both, as described herein. The communications manager 820, or various components thereof, may be an example of means for performing various aspects of sidelink feedback for increased capacity as described herein. For example, the communications manager 820 may include a sidelink message receiver 825, a feedback generator 830, a feedback indication transmitter 835, a sidelink message transmitter 840, a feedback indication receiver 845, a pattern receiver 850, a resource indication receiver 855, a pattern transmitter 860, a resource indication transmitter 865, a dummy signal transmitter 870, a dummy signal receiver 875, or any combination thereof. Each of these components may communicate, directly or indirectly, with one another (e.g., via one or more buses).

The communications manager 820 may support wireless communications at a first UE in accordance with examples as disclosed herein. The sidelink message receiver 825 may be configured as or otherwise support a means for receiving, from a second UE, a sidelink message via a set of resources of a sidelink channel. The feedback generator 830 may be configured as or otherwise support a means for generating, based at least on the sidelink message, a set of multiple feedback indications. The feedback indication transmitter 835 may be configured as or otherwise support a means for transmitting, via a sidelink feedback channel to the second UE and in accordance with an interlace, the set of multiple feedback indications via one or more configurable resources, the interlace indicating a set of multiple frequency resources including the one or more configurable resources, where the set of multiple frequency resources are uniformly distributed across a bandwidth of the sidelink feedback channel.

In some examples, the feedback indication transmitter 835 may be configured as or otherwise support a means for transmitting, at a first time, a first quantity of feedback indications via the one or more configurable resources at a first transmit power. In some examples, the feedback indication transmitter 835 may be configured as or otherwise support a means for transmitting, at a second time, a second quantity of feedback indications via the one or more configurable resources at a second transmit power, where the first quantity is the same as the second quantity and the first transmit power is lower than the second transmit power.

In some examples, to support transmitting the set of multiple feedback indications, the feedback indication transmitter 835 may be configured as or otherwise support a means for transmitting each feedback indication of the set of multiple feedback indications via a first cyclic shift pair of a first set of multiple cyclic shift pairs associated with a respective frequency resource of the one or more configurable resources.

In some examples, to support transmitting the set of multiple feedback indications via the one or more configurable resources, the dummy signal transmitter 870 may be configured as or otherwise support a means for transmitting one or more dummy signals via a remaining quantity of frequency resources of the set of multiple frequency resources, where each dummy signal of the one or more dummy signals is transmitted via a second cyclic shift pair of a second set of multiple cyclic shift pairs associated with a respective frequency resource of the remaining quantity of frequency resources, where the second cyclic shift pair is a first reserved cyclic shift pair for transmitting dummy signals.

In some examples, a first cyclic shift pair index of the first reserved cyclic shift pair of the respective frequency resource is offset from a second cyclic shift pair index of a second reserved cyclic shift pair of a subsequent frequency resource of the set of multiple frequency resources.

In some examples, the pattern receiver 850 may be configured as or otherwise support a means for receiving a message including an indication of a quantity of feedback indications to transmit, a pattern associated with the set of multiple frequency resources, or both, where transmitting the set of multiple feedback indications is based on receiving the message.

In some examples, the sidelink channel includes a set of multiple interlaces, and the feedback indication transmitter 835 may be configured as or otherwise support a means for transmitting the set of multiple feedback indications via a first interlace of the plurality of interlaces that is different from a second interlace of the set of multiple interlaces, where the second interlace is a common interlace.

In some examples, the feedback indication transmitter 835 may be configured as or otherwise support a means for transmitting a feedback indication of the set of multiple feedback indications, a dummy signal associated with the second interlace, or both, according to a transmit power that is below a threshold power based on a quantity of frequency resources between a first frequency resource of the one or more configurable resources for the feedback indication and a second frequency resource of the dummy signal exceeding a threshold quantity of frequency resources.

In some examples, the interlace includes a set of multiple interlaces, and the feedback indication transmitter 835 may be configured as or otherwise support a means for transmitting the set of multiple feedback indications via a first interlace of the plurality of interlaces, a second interlace of the plurality of interlaces, or both, where the second interlace is a common interlace.

In some examples, the feedback indication transmitter 835 may be configured as or otherwise support a means for transmitting the set of multiple feedback indications via a first subset of the set of multiple frequency resources, where the first subset includes the one or more configurable resources. In some examples, the feedback indication transmitter 835 may be configured as or otherwise support a means for transmitting one or more dummy signals via remaining frequency resources of the first subset, via one or more frequency resources of a second subset of the set of multiple frequency resources, or both.

In some examples, the resource indication receiver 855 may be configured as or otherwise support a means for receiving an indication to transmit the set of multiple feedback indications via a first resource pool or a second resource pool, where the first resource pool is a default resource pool and the second resource pool is a capacity enhanced resource pool.

In some examples, the first resource pool and the second resource pool are multiplexed across the bandwidth of the sidelink channel according to a frequency division multiplexing scheme, a time division multiplexing scheme, a code division multiplexing scheme, or any combination thereof.

In some examples, the indication is received via a control message or a radio resource control message.

Additionally, or alternatively, the communications manager 820 may support wireless communications at a first UE in accordance with examples as disclosed herein. The sidelink message transmitter 840 may be configured as or otherwise support a means for transmitting, to at least a second UE, a sidelink message via a set of resource of a sidelink channel. The feedback indication receiver 845 may be configured as or otherwise support a means for receiving, from the second UE via a sidelink feedback channel, a set of multiple feedback indications associated with the sidelink message via one or more configurable resources in accordance with an interlace, the interlace indicating a set of multiple frequency resources including the one or more configurable resources, where the set of multiple frequency resources are uniformly distributed across a bandwidth of the sidelink feedback channel.

In some examples, the feedback indication receiver 845 may be configured as or otherwise support a means for receiving, at a first time, a first quantity of feedback indications via the one or more configurable resources at a first power. In some examples, the feedback indication receiver 845 may be configured as or otherwise support a means for receiving, at a second time, a second quantity of feedback indications via the one or more configurable resources at a second power, where the first quantity is less than the second quantity and the first power is lower than the second power.

In some examples, to support receiving the set of multiple feedback indications, the feedback indication receiver 845 may be configured as or otherwise support a means for receiving each feedback indication of the set of multiple feedback indications via a first cyclic shift pair of a first set of multiple cyclic shift pairs associated with a respective frequency resource of the one or more configurable resources.

In some examples, to support receiving the set of multiple feedback indications via the one or more configurable resources, the dummy signal receiver 875 may be configured as or otherwise support a means for receiving one or more dummy signals via a remaining quantity of frequency resources of the set of multiple frequency resources, where each dummy signal of the one or more dummy signals is received via a second cyclic shift pair of a second set of multiple cyclic shift pairs associated with a respective frequency resource of the remaining quantity of frequency resources, where the second cyclic shift pair is a first reserved cyclic shift pair for communicating dummy signals.

In some examples, a first cyclic shift pair index of the first reserved cyclic shift pair of the respective frequency resource is offset from a second cyclic shift pair index of a second reserved cyclic shift pair of a subsequent frequency resource of the set of multiple frequency resources.

In some examples, the pattern transmitter 860 may be configured as or otherwise support a means for transmitting a message including an indication of a quantity of feedback indications for the second UE to transmit, a pattern associated with the set of multiple frequency resources, or both, where receiving the set of multiple feedback indications is based on transmitting the message.

In some examples, the sidelink channel includes a set of multiple interlaces, and the feedback indication receiver 845 may be configured as or otherwise support a means for receiving the set of multiple feedback indications via a first interlace of the plurality of interlaces that is different from a second interlace of the set of multiple interlaces, where the second interlace is a common interlace.

In some examples, the feedback indication receiver 845 may be configured as or otherwise support a means for receiving a feedback indication of the set of multiple feedback indications, a dummy signal associated with the second interlace, or both, according to a power that is below a threshold power based on a quantity of frequency resources between a first frequency resource of the one or more configurable resources for the feedback indication and a second frequency resource of the dummy signal exceeding a threshold quantity of frequency resources.

In some examples, the interlace includes a set of multiple interlaces, and the feedback indication receiver 845 may be configured as or otherwise support a means for receiving the set of multiple feedback indications via a first interlace of the plurality of interlaces, a second interlace of the plurality of interlaces, or both, where the second interlace is a common interlace.

In some examples, the feedback indication receiver 845 may be configured as or otherwise support a means for receiving the set of multiple feedback indications via a first subset of the set of multiple frequency resources, where the first subset includes the one or more configurable resources. In some examples, the feedback indication receiver 845 may be configured as or otherwise support a means for receiving one or more dummy signals via remaining frequency resources of the first subset, via one or more frequency resources of a second subset of the set of multiple frequency resources, or both.

In some examples, the resource indication transmitter 865 may be configured as or otherwise support a means for transmitting an indication for the second UE to transmit the set of multiple feedback indications via a first resource pool or a second resource pool, where the first resource pool is a default resource pool and the second resource pool is a capacity enhanced resource pool.

In some examples, the first resource pool and the second resource pool are multiplexed across the bandwidth of the sidelink channel according to a frequency division multiplexing scheme, a time division multiplexing scheme, a code division multiplexing scheme, or any combination thereof.

In some examples, the indication is transmitted via a control message or a radio resource control message.

Figure 9:
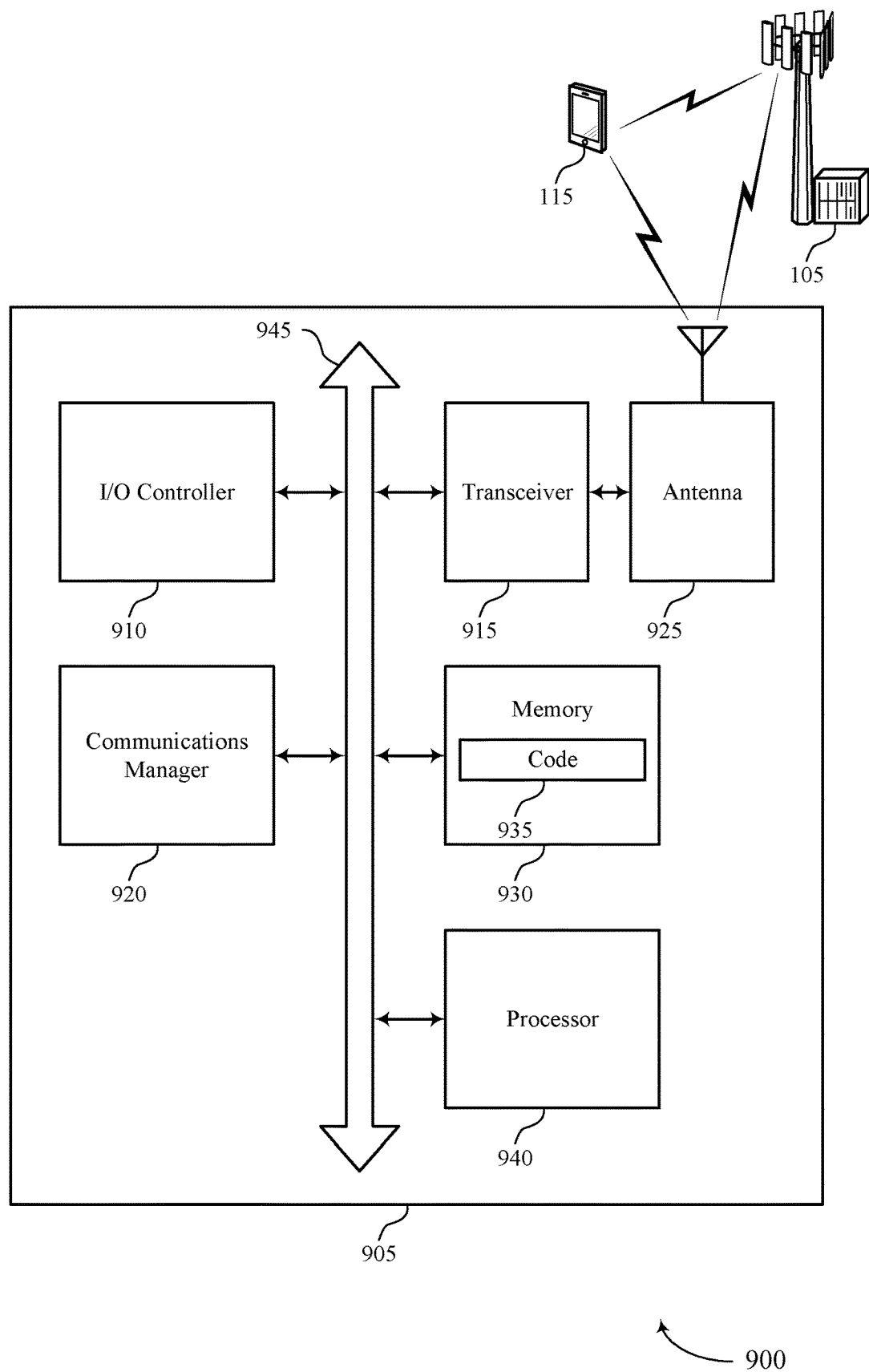
FIG. 9 shows a diagram of a system including a device that supports sidelink feedback for increased capacity in accordance with one or more aspects of the present disclosure.

FIG. 9 shows a diagram of a system 900 including a device 905 that supports sidelink feedback for increased capacity in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting sidelink feedback for increased capacity). For example, the device 905 or a component of the device 905 may include a processor 940 and memory 930 coupled with or to the processor 940, the processor 940 and memory 930 configured to perform various functions described herein.

The communications manager 920 may support wireless communications at a first UE in accordance with examples as disclosed herein. For example, the communications manager 920 may be configured as or otherwise support a means for receiving, from a second UE, a sidelink message via a set of resources of a sidelink channel. The communications manager 920 may be configured as or otherwise support a means for generating, based at least on the sidelink message, a set of multiple feedback indications. The communications manager 920 may be configured as or otherwise support a means for transmitting, via a sidelink feedback channel to the second UE and in accordance with an interlace, the set of multiple feedback indications via one or more configurable resources, the interlace indicating a set of multiple frequency resources including the one or more configurable resources, where the set of multiple frequency resources are uniformly distributed across a bandwidth of the sidelink feedback channel.

Additionally, or alternatively, the communications manager 920 may support wireless communications at a first UE in accordance with examples as disclosed herein. For example, the communications manager 920 may be configured as or otherwise support a means for transmitting, to at least a second UE, a sidelink message via a set of resource of a sidelink channel. The communications manager 920 may be configured as or otherwise support a means for receiving, from the second UE via a sidelink feedback channel, a set of multiple feedback indications associated with the sidelink message via one or more configurable resources in accordance with an interlace, the interlace indicating a set of multiple frequency resources including the one or more configurable resources, where the set of multiple frequency resources are uniformly distributed across a bandwidth of the sidelink feedback channel.

By including or configuring the communications manager 920 in accordance with examples as described herein, the device 905 may support techniques for enhancing sidelink feedbacking indications, which may improve the reliability of sidelink communications and thus improve device power consumption and user experience.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of sidelink feedback for increased capacity as described herein, or the processor 940 and the memory 930 may be otherwise configured to perform or support such operations.

Figure 10:
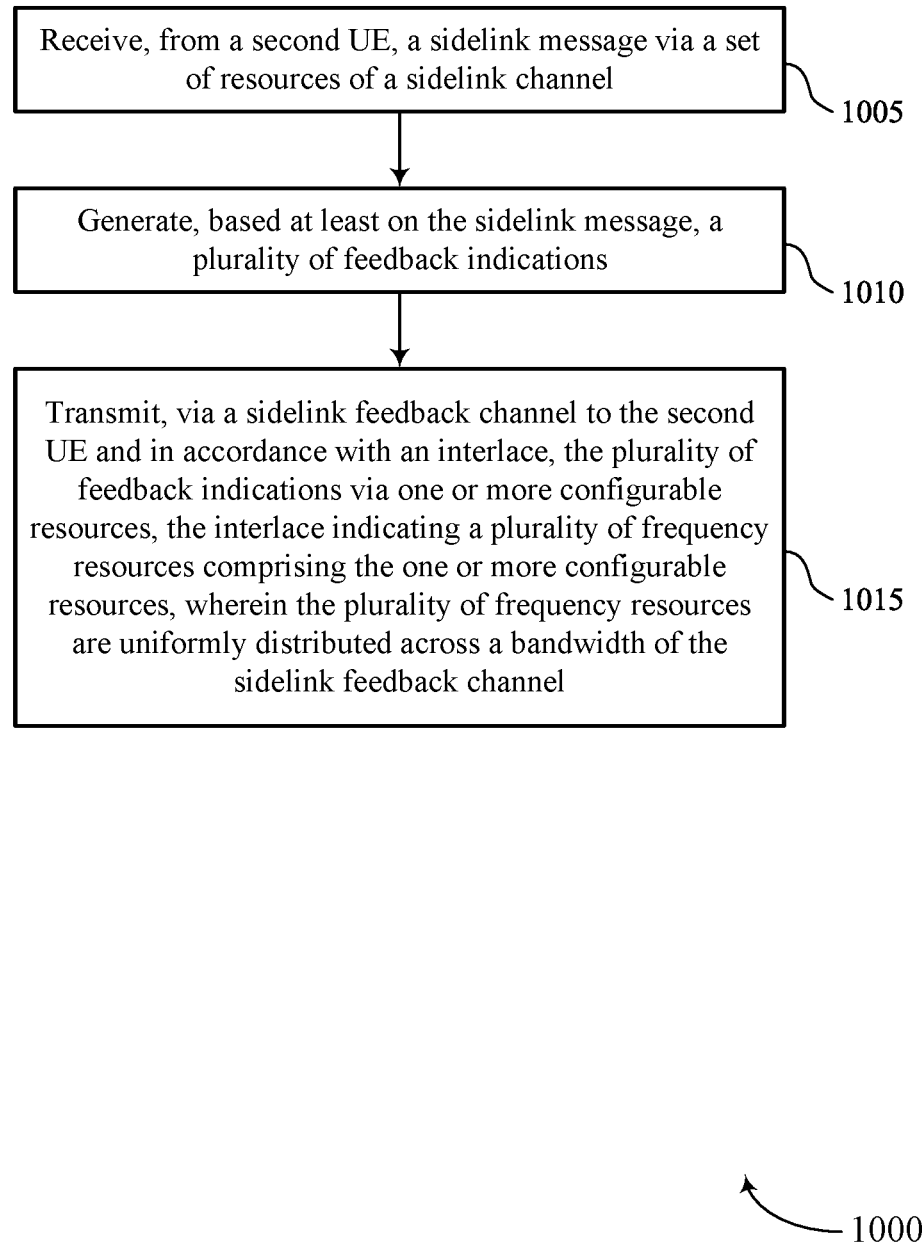
FIGS. 10 through 15 show flowcharts illustrating methods that support sidelink feedback for increased capacity in accordance with one or more aspects of the present disclosure.

FIG. 10 shows a flowchart illustrating a method 1000 that supports sidelink feedback for increased capacity in accordance with one or more aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1005, the method may include receiving, from a second UE, a sidelink message via a set of resources of a sidelink channel. The operations of 1005 may be performed in accordance with examples as disclosed herein. In some examples, aspects of the operations of 1005 may be performed by a sidelink message receiver 825 as described with reference to FIG. 8.

At 1010, the method may include generating, based at least on the sidelink message, a set of multiple feedback indications. The operations of 1010 may be performed in accordance with examples as disclosed herein. In some examples, aspects of the operations of 1010 may be performed by a feedback generator 830 as described with reference to FIG. 8.

At 1015, the method may include transmitting, via a sidelink feedback channel to the second UE and in accordance with an interlace, the set of multiple feedback indications via one or more configurable resources, the interlace indicating a set of multiple frequency resources including the one or more configurable resources, where the set of multiple frequency resources are uniformly distributed across a bandwidth of the sidelink feedback channel. The operations of 1015 may be performed in accordance with examples as disclosed herein. In some examples, aspects of the operations of 1015 may be performed by a feedback indication transmitter 835 as described with reference to FIG. 8.

Figure 11:
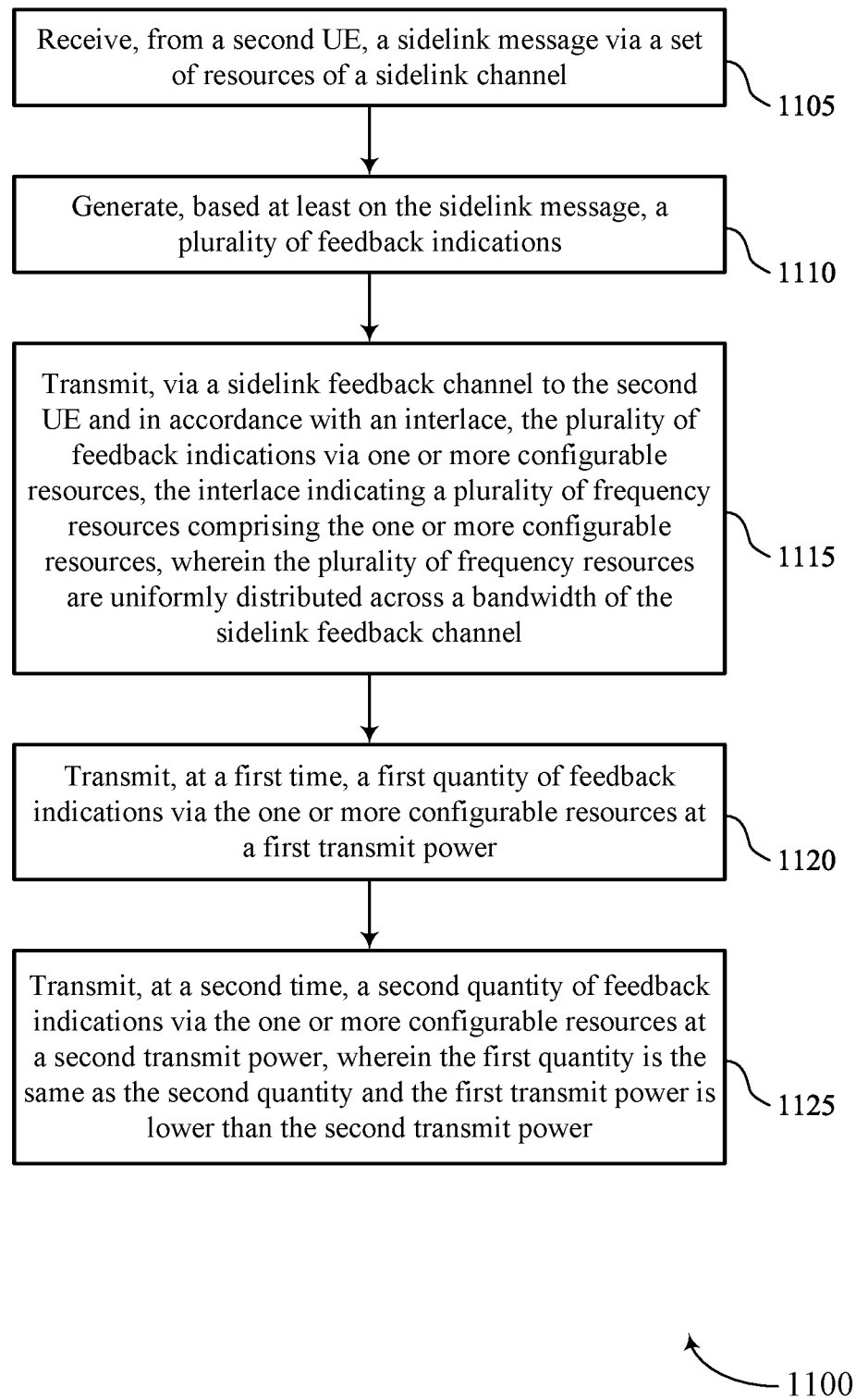

FIG. 11 shows a flowchart illustrating a method 1100 that supports sidelink feedback for increased capacity in accordance with one or more aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1105, the method may include receiving, from a second UE, a sidelink message via a set of resources of a sidelink channel. The operations of 1105 may be performed in accordance with examples as disclosed herein. In some examples, aspects of the operations of 1105 may be performed by a sidelink message receiver 825 as described with reference to FIG. 8.

At 1110, the method may include generating, based at least on the sidelink message, a set of multiple feedback indications. The operations of 1110 may be performed in accordance with examples as disclosed herein. In some examples, aspects of the operations of 1110 may be performed by a feedback generator 830 as described with reference to FIG. 8.

At 1115, the method may include transmitting, via a sidelink feedback channel to the second UE and in accordance with an interlace, the set of multiple feedback indications via one or more configurable resources, the interlace indicating a set of multiple frequency resources including the one or more configurable resources, where the set of multiple frequency resources are uniformly distributed across a bandwidth of the sidelink feedback channel. The operations of 1115 may be performed in accordance with examples as disclosed herein. In some examples, aspects of the operations of 1115 may be performed by a feedback indication transmitter 835 as described with reference to FIG. 8.

At 1120, the method may include transmitting, at a first time, a first quantity of feedback indications via the one or more configurable resources at a first transmit power. The operations of 1120 may be performed in accordance with examples as disclosed herein. In some examples, aspects of the operations of 1120 may be performed by a feedback indication transmitter 835 as described with reference to FIG. 8.

At 1125, the method may include transmitting, at a second time, a second quantity of feedback indications via the one or more configurable resources at a second transmit power, where the first quantity is the same as the second quantity and the first transmit power is lower than the second transmit power. The operations of 1125 may be performed in accordance with examples as disclosed herein. In some examples, aspects of the operations of 1125 may be performed by a feedback indication transmitter 835 as described with reference to FIG. 8.

Figure 12:
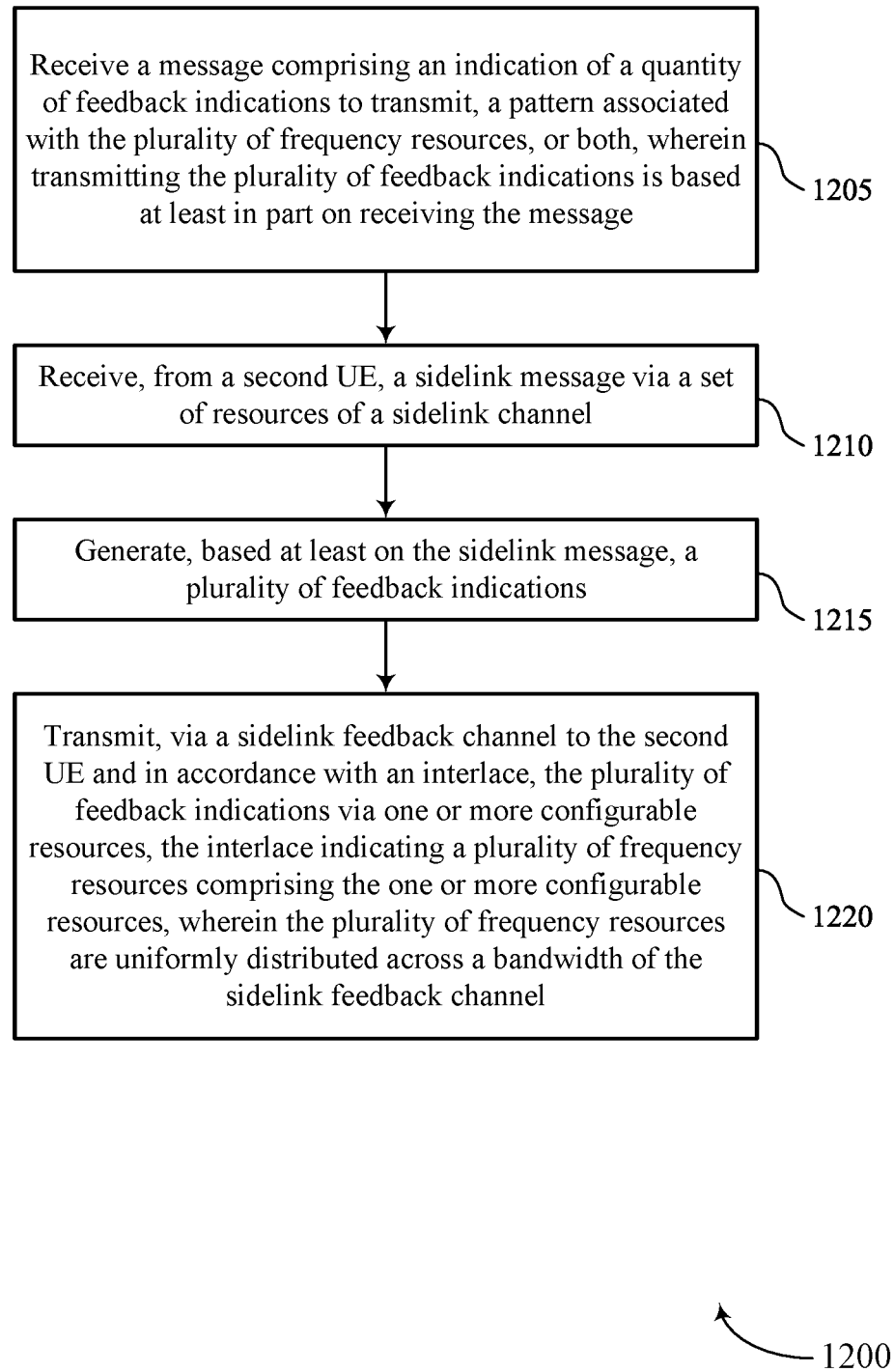

FIG. 12 shows a flowchart illustrating a method 1200 that supports sidelink feedback for increased capacity in accordance with one or more aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1205, the method may include receiving a message including an indication of a quantity of feedback indications to transmit, a pattern associated with the set of multiple frequency resources, or both, where transmitting the set of multiple feedback indications is based on receiving the message. The operations of 1205 may be performed in accordance with examples as disclosed herein. In some examples, aspects of the operations of 1205 may be performed by a pattern receiver 850 as described with reference to FIG. 8.

At 1210, the method may include receiving, from a second UE, a sidelink message via a set of resources of a sidelink channel. The operations of 1210 may be performed in accordance with examples as disclosed herein. In some examples, aspects of the operations of 1210 may be performed by a sidelink message receiver 825 as described with reference to FIG. 8.

At 1215, the method may include generating, based at least on the sidelink message, a set of multiple feedback indications. The operations of 1215 may be performed in accordance with examples as disclosed herein. In some examples, aspects of the operations of 1215 may be performed by a feedback generator 830 as described with reference to FIG. 8.

At 1220, the method may include transmitting, via a sidelink feedback channel to the second UE and in accordance with an interlace, the set of multiple feedback indications via one or more configurable resources, the interlace indicating a set of multiple frequency resources including the one or more configurable resources, where the set of multiple frequency resources are uniformly distributed across a bandwidth of the sidelink feedback channel. The operations of 1220 may be performed in accordance with examples as disclosed herein. In some examples, aspects of the operations of 1220 may be performed by a feedback indication transmitter 835 as described with reference to FIG. 8.

Figure 13:
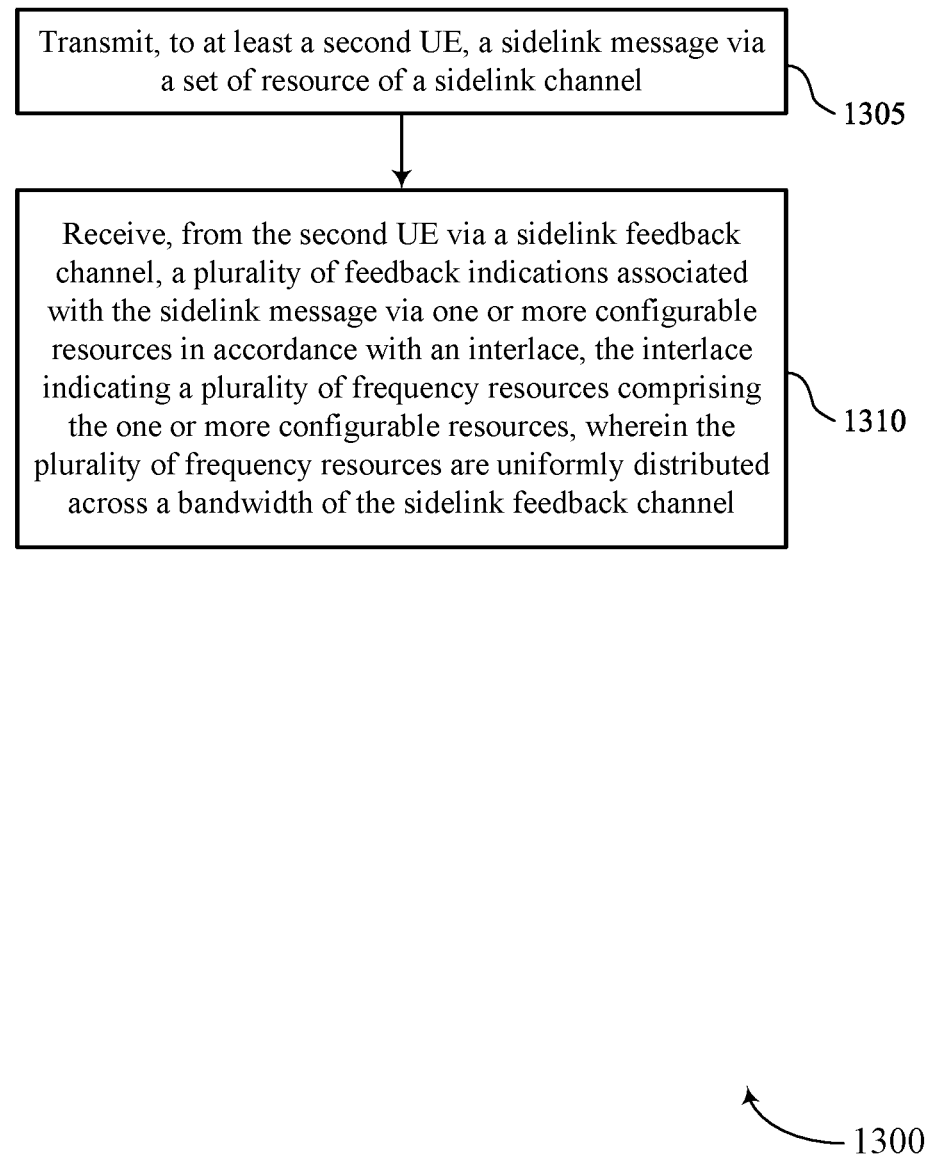

FIG. 13 shows a flowchart illustrating a method 1300 that supports sidelink feedback for increased capacity in accordance with one or more aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1305, the method may include transmitting, to at least a second UE, a sidelink message via a set of resource of a sidelink channel. The operations of 1305 may be performed in accordance with examples as disclosed herein. In some examples, aspects of the operations of 1305 may be performed by a sidelink message transmitter 840 as described with reference to FIG. 8.

At 1310, the method may include receiving, from the second UE via a sidelink feedback channel, a set of multiple feedback indications associated with the sidelink message via one or more configurable resources in accordance with an interlace, the interlace indicating a set of multiple frequency resources including the one or more configurable resources, where the set of multiple frequency resources are uniformly distributed across a bandwidth of the sidelink feedback channel. The operations of 1310 may be performed in accordance with examples as disclosed herein. In some examples, aspects of the operations of 1310 may be performed by a feedback indication receiver 845 as described with reference to FIG. 8.

Figure 14:
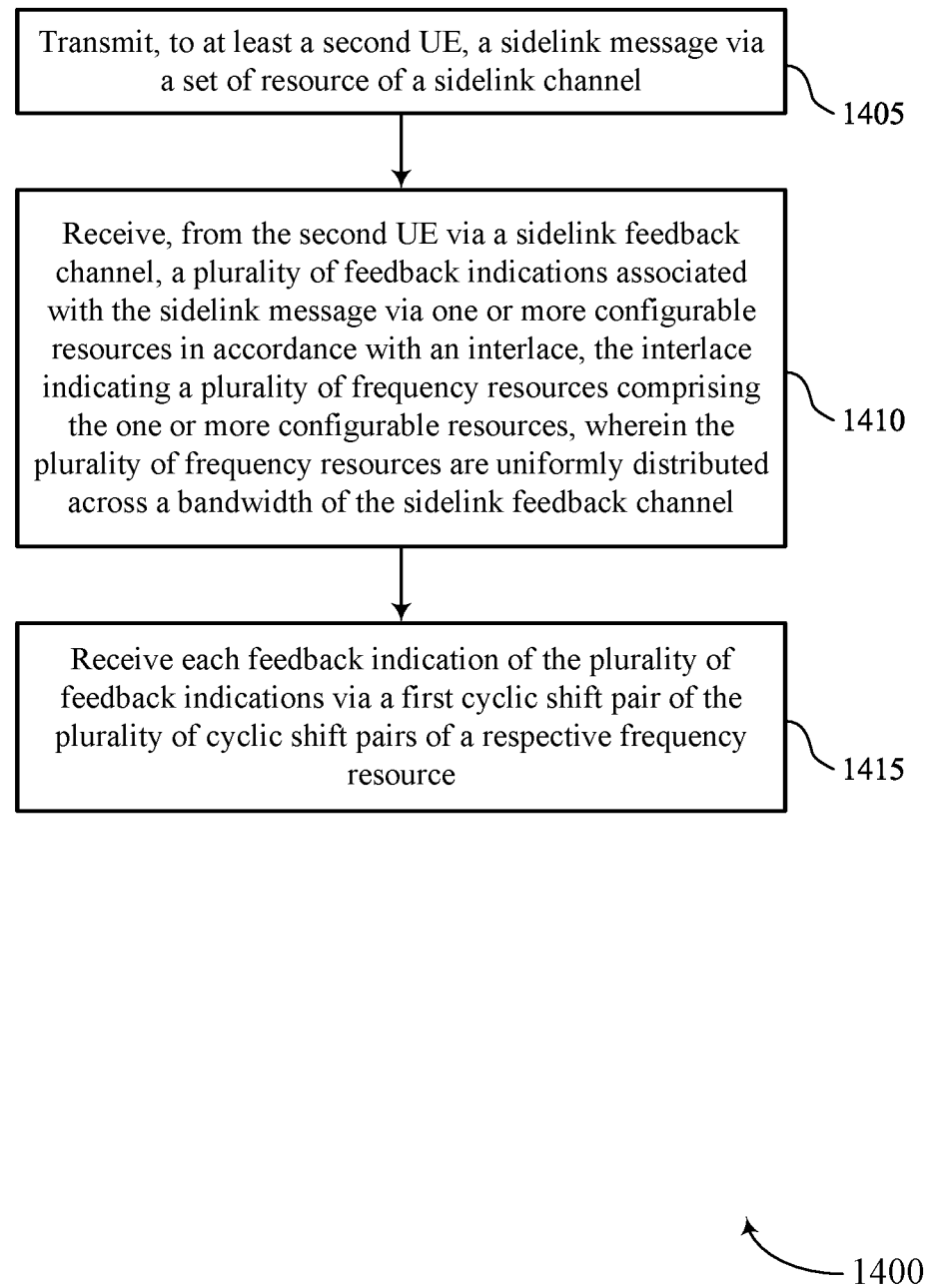

FIG. 14 shows a flowchart illustrating a method 1400 that supports sidelink feedback for increased capacity in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include transmitting, to at least a second UE, a sidelink message via a set of resource of a sidelink channel. The operations of 1405 may be performed in accordance with examples as disclosed herein. In some examples, aspects of the operations of 1405 may be performed by a sidelink message transmitter 840 as described with reference to FIG. 8.

At 1410, the method may include receiving, from the second UE via a sidelink feedback channel, a set of multiple feedback indications associated with the sidelink message via one or more configurable resources in accordance with an interlace, the interlace indicating a set of multiple frequency resources including the one or more configurable resources, where the set of multiple frequency resources are uniformly distributed across a bandwidth of the sidelink feedback channel. The operations of 1410 may be performed in accordance with examples as disclosed herein. In some examples, aspects of the operations of 1410 may be performed by a feedback indication receiver 845 as described with reference to FIG. 8.

At 1415, the method may include receiving each feedback indication of the set of multiple feedback indications via a first cyclic shift pair of a first set of multiple cyclic shift pairs associated with a respective frequency resource of the one or more configurable resources. The operations of 1415 may be performed in accordance with examples as disclosed herein. In some examples, aspects of the operations of 1415 may be performed by a feedback indication receiver 845 as described with reference to FIG. 8.

Figure 15:
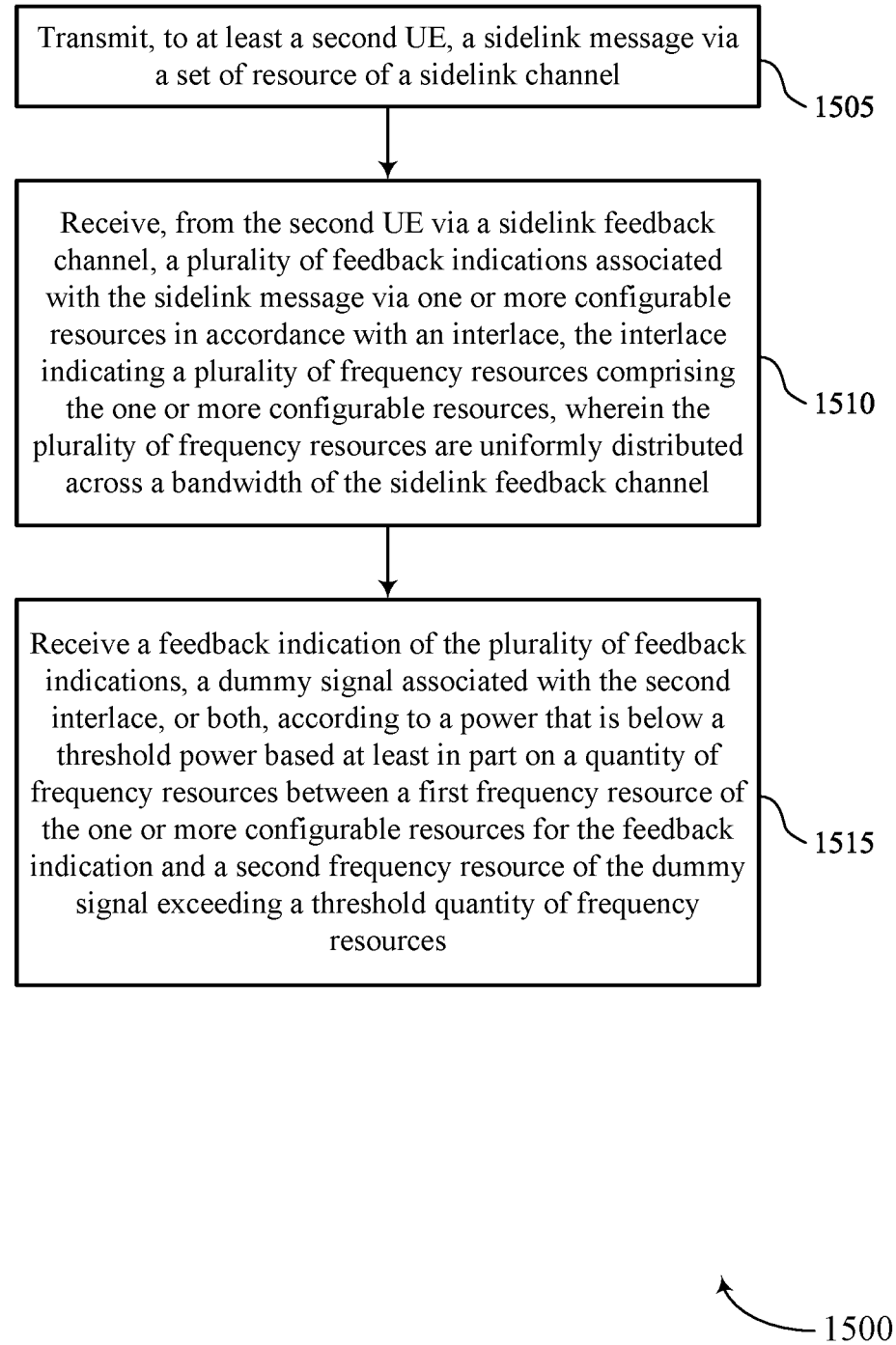

FIG. 15 shows a flowchart illustrating a method 1500 that supports sidelink feedback for increased capacity in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include transmitting, to at least a second UE, a sidelink message via a set of resource of a sidelink channel. The operations of 1505 may be performed in accordance with examples as disclosed herein. In some examples, aspects of the operations of 1505 may be performed by a sidelink message transmitter 840 as described with reference to FIG. 8.

At 1510, the method may include receiving, from the second UE via a sidelink feedback channel, a set of multiple feedback indications associated with the sidelink message via one or more configurable resources in accordance with an interlace, the interlace indicating a set of multiple frequency resources including the one or more configurable resources, where the set of multiple frequency resources are uniformly distributed across a bandwidth of the sidelink feedback channel. The operations of 1510 may be performed in accordance with examples as disclosed herein. In some examples, aspects of the operations of 1510 may be performed by a feedback indication receiver 845 as described with reference to FIG. 8.

At 1515, the method may include receiving a feedback indication of the set of multiple feedback indications, a dummy signal associated with the second interlace, or both, according to a power that is below a threshold power based on a quantity of frequency resources between a first frequency resource of the one or more configurable resources for the feedback indication and a second frequency resource of the dummy signal exceeding a threshold quantity of frequency resources. The operations of 1515 may be performed in accordance with examples as disclosed herein. In some examples, aspects of the operations of 1515 may be performed by a feedback indication receiver 845 as described with reference to FIG. 8.

The following provides an overview of aspects of the present disclosure:

Aspect 1: A method for wireless communications at a first UE, comprising: receiving, from a second UE, a sidelink message via a set of resources of a sidelink channel; generating, based at least on the sidelink message, a plurality of feedback indications; and transmitting, via a sidelink feedback channel to the second UE and in accordance with an interlace, the plurality of feedback indications via one or more configurable resources, the interlace indicating a plurality of frequency resources comprising the one or more configurable resources, wherein the plurality of frequency resources are uniformly distributed across a bandwidth of the sidelink feedback channel.

Aspect 2: The method of aspect 1, further comprising: transmitting, at a first time, a first quantity of feedback indications via the one or more configurable resources at a first transmit power; and transmitting, at a second time, a second quantity of feedback indications via the one or more configurable resources at a second transmit power, wherein the first quantity is a same quantity as the second quantity and the first transmit power is lower than the second transmit power.

Aspect 3: The method of any of aspects 1 through 2, wherein transmitting the plurality of feedback indications comprises: transmitting each feedback indication of the plurality of feedback indications via a first cyclic shift pair of a first plurality of cyclic shift pairs via a respective frequency resource of the one or more configurable resources, wherein each frequency resource of the plurality of frequency resources comprises a plurality of cyclic shift pairs corresponding to a plurality of cyclic shift pair indices.

Aspect 4: The method of aspect 3, wherein transmitting the plurality of feedback indications via the one or more configurable resources comprises: transmitting one or more dummy signals via a remaining quantity of frequency resources of the plurality of frequency resources, wherein each dummy signal of the one or more dummy signals is transmitted via a second cyclic shift pair of a second plurality of cyclic shift pairs associated with a respective frequency resource of the remaining quantity of frequency resources, wherein the second cyclic shift pair is a first reserved cyclic shift pair for transmitting dummy signals.

Aspect 5: The method of aspect 4, wherein a cyclic shift pair index of the first reserved cyclic shift pair of the respective frequency resource is offset from a cyclic shift pair index of a second reserved cyclic shift pair of a subsequent frequency resource of the plurality of frequency resources.

Aspect 6: The method of any of aspects 1 through 5, further comprising: receiving a message comprising an indication of a quantity of feedback indications to transmit, a pattern associated with the plurality of frequency resources, or both, wherein the plurality of feedback indications are transmitted based at least in part on the message.

Aspect 7: The method of any of aspects 1 through 6, wherein the sidelink channel comprises a plurality of interlaces and the plurality of frequency resources are associated with a first interlace of the plurality of interlaces, the method further comprising: transmitting the plurality of feedback indications via the first interlace of the plurality of interlaces that is different from a second interlace of the plurality of interlaces, wherein the second interlace is a common interlace.

Aspect 8: The method of aspect 7, further comprising: transmitting a feedback indication of the plurality of feedback indications, a dummy signal associated with the second interlace, or both, according to a transmit power that is below a threshold power based at least in part on a quantity of frequency resources between a first frequency resource of the one or more configurable resources for the feedback indication and a second frequency resource of the dummy signal exceeding a threshold quantity of frequency resources.

Aspect 9: The method of any of aspects 1 through 8, wherein the interlace comprises a plurality of interlaces and the plurality of frequency resources are associated with a first interlace of the plurality of interlaces, a second interlace of the plurality of interlaces different from the first interlace, or both, the method further comprising: transmitting the plurality of feedback indications via the first interlace, a second interlace, or both, wherein the second interlace is a common interlace.

Aspect 10: The method of any of aspects 1 through 9, further comprising: transmitting the plurality of feedback indications via a first subset of the plurality of frequency resources, wherein the first subset comprises the one or more configurable resources; and transmitting one or more dummy signals via remaining frequency resources of the first subset, via one or more frequency resources of a second subset of the plurality of frequency resources, or both.

Aspect 11: The method of any of aspects 1 through 10, further comprising: receiving an indication to transmit the plurality of feedback indications via a first resource pool or a second resource pool, wherein the first resource pool is a default resource pool and the second resource pool is a capacity enhanced resource pool.

Aspect 12: The method of aspect 11, wherein the first resource pool and the second resource pool are multiplexed across the bandwidth of the sidelink channel according to a frequency division multiplexing scheme, a time division multiplexing scheme, a code division multiplexing scheme, or any combination thereof.

Aspect 13: The method of any of aspects 11 through 12, wherein the indication is received via a downlink control information message, a medium access control control element, or a radio resource control message.

Aspect 14: A method for wireless communications at a first UE, comprising: transmitting, to at least a second UE, a sidelink message via a set of resource of a sidelink channel; and receiving, from the second UE via a sidelink feedback channel, a plurality of feedback indications associated with the sidelink message via one or more configurable resources in accordance with an interlace, the interlace indicating a plurality of frequency resources comprising the one or more configurable resources, wherein the plurality of frequency resources are uniformly distributed across a bandwidth of the sidelink feedback channel.

Aspect 15: The method of aspect 14, further comprising: receiving, at a first time, a first quantity of feedback indications via the one or more configurable resources at a first power; and receiving, at a second time, a second quantity of feedback indications via the one or more configurable resources at a second power, wherein the first quantity is less than the second quantity and the first power is lower than the second power.

Aspect 16: The method of any of aspects 14 through 15, wherein receiving the plurality of feedback indications comprises: receiving each feedback indication of the plurality of feedback indications via a first cyclic shift pair of a plurality of cyclic shift pairs of a respective frequency resource of the plurality of frequency resources, wherein each frequency resource of the plurality of frequency resources comprises the plurality of cyclic shift pairs corresponding to a plurality of cyclic shift pair indices.

Aspect 17: The method of aspect 16, wherein receiving the plurality of feedback indications via the one or more configurable resources comprises: receiving one or more dummy signals via a remaining quantity of frequency resources of the plurality of frequency resources, wherein each dummy signal of the one or more dummy signals is received via a second cyclic shift pair of a second plurality of cyclic shift pairs associated with a respective frequency resource of the remaining quantity of frequency resources, wherein the second cyclic shift pair is a first reserved cyclic shift pair for communicating dummy signals.

Aspect 18: The method of aspect 17, wherein a first cyclic shift pair index of the first reserved cyclic shift pair of the respective frequency resource is offset from a second cyclic shift pair index of a second reserved cyclic shift pair of a subsequent frequency resource of the plurality of frequency resources.

Aspect 19: The method of any of aspects 14 through 18, further comprising: transmitting a message comprising an indication of a quantity of feedback indications for the second UE to transmit, a pattern associated with the plurality of frequency resources, or both, wherein receiving the plurality of feedback indications is based at least in part on transmitting the message.

Aspect 20: The method of any of aspects 14 through 19, wherein the sidelink channel comprises a plurality of interlaces and the plurality of frequency resources are associated with a first interlace of the plurality of interlaces, the method further comprising: receiving the plurality of feedback indications via the first interlace that is different from a second interlace of the plurality of interlaces, wherein the second interlace is a common interlace.

Aspect 21: The method of any of aspects 14 through 20, further comprising: receiving a feedback indication of the plurality of feedback indications, a dummy signal associated with a second interlace, or both, according to a power that is below a threshold power based at least in part on a quantity of frequency resources between a first frequency resource of the one or more configurable resources for the feedback indication and a second frequency resource of the dummy signal exceeding a threshold quantity of frequency resources.

Aspect 22: The method of any of aspects 14 through 21, wherein the interlace comprises a plurality of interlaces and the plurality of frequency resources are associated with a first interlace of the plurality of interlaces, a second interlace of the plurality of interlaces different from the first interlace, or both, the method further comprising: receiving the plurality of feedback indications via the first interlace, a second interlace, or both, wherein the second interlace is a common interlace.

Aspect 23: The method of any of aspects 14 through 22, further comprising: receiving the plurality of feedback indications via a first subset of the plurality of frequency resources, wherein the first subset comprises the one or more configurable resources; and receiving one or more dummy signals via remaining frequency resources of the first subset, via one or more frequency resources of a second subset of the plurality of frequency resources, or both.

Aspect 24: The method of any of aspects 14 through 23, further comprising: transmitting an indication for the second UE to transmit the plurality of feedback indications via a first resource pool or a second resource pool, wherein the first resource pool is a default resource pool and the second resource pool is a capacity enhanced resource pool.

Aspect 25: The method of aspect 24, wherein the first resource pool and the second resource pool are multiplexed across the bandwidth of the sidelink channel according to a frequency division multiplexing scheme, a time division multiplexing scheme, a code division multiplexing scheme, or any combination thereof.

Aspect 26: The method of any of aspects 24 through 25, wherein the indication is transmitted via a downlink control information message, a medium access control control element, or a radio resource control message.

Aspect 27: An apparatus for wireless communications at a first UE, comprising a processor; memory coupled with the processor; and instructions stored in the memory and executable by the processor to cause the apparatus to perform a method of any of aspects 1 through 13.

Aspect 28: An apparatus for wireless communications at a first UE, comprising at least one means for performing a method of any of aspects 1 through 13.

Aspect 29: A non-transitory computer-readable medium storing code for wireless communications at a first UE, the code comprising instructions executable by a processor to perform a method of any of aspects 1 through 13.

Aspect 30: An apparatus for wireless communications at a first UE, comprising a processor; memory coupled with the processor; and instructions stored in the memory and executable by the processor to cause the apparatus to perform a method of any of aspects 14 through 26.

Aspect 31: An apparatus for wireless communications at a first UE, comprising at least one means for performing a method of any of aspects 14 through 26.

Aspect 32: A non-transitory computer-readable medium storing code for wireless communications at a first UE, the code comprising instructions executable by a processor to perform a method of any of aspects 14 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a first user equipment (UE), comprising:
   a processor;
   memory coupled with the processor; and
   instructions stored in the memory and executable by the processor to cause the apparatus to:
   receive, from a second UE, a sidelink message via a set of resources of a sidelink channel;
   transmit, via a sidelink feedback channel to the second UE and in accordance with an interlace, a plurality of feedback indications associated with the sidelink message via one or more configurable resources, the interlace indicating a plurality of frequency resources, wherein a first subset of the plurality of frequency resources comprises the one or more configurable resources; and
   transmit one or more dummy signals via remaining frequency resources of the first subset, via one or more frequency resources of a second subset of the plurality of frequency resources, or both.

2. The apparatus of claim 1, wherein the instructions are further executable by the processor to cause the apparatus to:
   transmit, at a first time, a first quantity of feedback indications via the one or more configurable resources at a first transmit power; and
   transmit, at a second time, a second quantity of feedback indications via the one or more configurable resources at a second transmit power, wherein the first quantity is a same quantity as the second quantity and the first transmit power is lower than the second transmit power.

3. The apparatus of claim 1, wherein the instructions to transmit the plurality of feedback indications are executable by the processor to cause the apparatus to:
   transmit each feedback indication of the plurality of feedback indications via a first cyclic shift pair of a first plurality of cyclic shift pairs via a respective frequency resource of the one or more configurable resources, wherein each frequency resource of the plurality of frequency resources comprises a plurality of cyclic shift pairs corresponding to a plurality of cyclic shift pair indices.

4. The apparatus of claim 3,
wherein each dummy signal of the one or more dummy signals is transmitted via a second cyclic shift pair of a second plurality of cyclic shift pairs associated with a respective frequency resource of the remaining quantity of frequency resources, wherein the second cyclic shift pair is a first reserved cyclic shift pair for transmitting dummy signals.

5. The apparatus of claim 4, wherein a cyclic shift pair index of the first reserved cyclic shift pair of the respective frequency resource is offset from a cyclic shift pair index of a second reserved cyclic shift pair of a subsequent frequency resource of the plurality of frequency resources.

6. The apparatus of claim 1, wherein the instructions are further executable by the processor to cause the apparatus to:
receive a message comprising an indication of a quantity of feedback indications to transmit, a pattern associated with the plurality of frequency resources, or both, wherein the plurality of feedback indications are transmitted based at least in part on the message.

7. The apparatus of claim 1, wherein the sidelink channel comprises a plurality of interlaces and the plurality of frequency resources are associated with a first interlace of the plurality of interlaces, and the instructions are further executable by the processor to cause the apparatus to:
transmit the plurality of feedback indications via the first interlace of the plurality of interlaces that is different from a second interlace of the plurality of interlaces, wherein the second interlace is a common interlace.

8. The apparatus of claim 7, wherein the instructions are further executable by the processor to cause the apparatus to:
transmit a feedback indication of the plurality of feedback indications, a dummy signal of the one or more dummy signals associated with the second interlace, or both, according to a transmit power that is below a threshold power based at least in part on a quantity of frequency resources between a first frequency resource of the one or more configurable resources for the feedback indication and a second frequency resource of the dummy signal exceeding a threshold quantity of frequency resources.

9. The apparatus of claim 1, wherein the interlace comprises a plurality of interlaces and the plurality of frequency resources are associated with a first interlace of the plurality of interlaces, and the instructions are further executable by the processor to cause the apparatus to:
transmit the plurality of feedback indications via the first interlace, a second interlace, or both, wherein the second interlace is a common interlace.

10. The apparatus of claim 1, wherein the instructions are further executable by the processor to cause the apparatus to:
receive an indication to transmit the plurality of feedback indications via a first resource pool or a second resource pool, wherein the first resource pool is a default resource pool and the second resource pool is a capacity enhanced resource pool.

11. The apparatus of claim 10, wherein the first resource pool and the second resource pool are multiplexed across the bandwidth of the sidelink channel according to a frequency division multiplexing scheme, a time division multiplexing scheme, a code division multiplexing scheme, or any combination thereof.

12. The apparatus of claim 10, wherein the indication is received via a downlink control information message, a medium access control control element, or a radio resource control message.

13. An apparatus for wireless communications at a first user equipment (UE), comprising:
a processor;
memory coupled with the processor; and
instructions stored in the memory and executable by the processor to cause the apparatus to:
transmit, to at least a second UE, a sidelink message via a set of resource of a sidelink channel;
receive, from the second UE via a sidelink feedback channel, a plurality of feedback indications associated with the sidelink message via one or more configurable resources in accordance with an interlace, the interlace indicating a plurality of frequency resources, wherein a first subset of the plurality of frequency resources comprises the one or more configurable resources; and
receive one or more dummy signals via remaining frequency resources of the first subset, via one or more frequency resources of a second subset of the plurality of frequency resources, or both.

14. The apparatus of claim 13, wherein the instructions are further executable by the processor to cause the apparatus to:
receive, at a first time, a first quantity of feedback indications via the one or more configurable resources at a first power; and
receive, at a second time, a second quantity of feedback indications via the one or more configurable resources at a second power, wherein the first quantity is less than the second quantity and the first power is lower than the second power.

15. The apparatus of claim 13, wherein the instructions to receive the plurality of feedback indications are executable by the processor to cause the apparatus to:
receive each feedback indication of the plurality of feedback indications via a first cyclic shift pair of a plurality of cyclic shift pairs of a respective frequency resource of the plurality of frequency resources, wherein each frequency resource of the plurality of frequency resources comprises the plurality of cyclic shift pairs corresponding to a plurality of cyclic shift pair indices.

16. The apparatus of claim 15,
wherein each dummy signal of the one or more dummy signals is received via a second cyclic shift pair of a second plurality of cyclic shift pairs associated with a respective frequency resource of the remaining quantity of frequency resources, wherein the second cyclic shift pair is a first reserved cyclic shift pair for communicating dummy signals.

17. The apparatus of claim 16, wherein a first cyclic shift pair index of the first reserved cyclic shift pair of the respective frequency resource is offset from a second cyclic shift pair index of a second reserved cyclic shift pair of a subsequent frequency resource of the plurality of frequency resources.

18. The apparatus of claim 13, wherein the instructions are further executable by the processor to cause the apparatus to:
transmit a message comprising an indication of a quantity of feedback indications for the second UE to transmit, a pattern associated with the plurality of frequency resources, or both, wherein receiving the plurality of feedback indications is based at least in part on transmitting the message.

19. The apparatus of claim 13, wherein the sidelink channel comprises a plurality of interlaces and the plurality of frequency resources are associated with a first interlace of the plurality of interlaces, and the instructions are further executable by the processor to cause the apparatus to:

receive the plurality of feedback indications via the first interlace that is different from a second interlace of the plurality of interlaces, wherein the second interlace is a common interlace.

20. The apparatus of claim 13, wherein the instructions are further executable by the processor to cause the apparatus to:

receive a feedback indication of the plurality of feedback indications, a dummy signal associated with a second interlace, or both, according to a power that is below a threshold power based at least in part on a quantity of frequency resources between a first frequency resource of the one or more configurable resources for the feedback indication and a second frequency resource of the dummy signal exceeding a threshold quantity of frequency resources.

21. The apparatus of claim 13, wherein the interlace comprises a plurality of interlaces and the plurality of frequency resources are associated with a first interlace of the plurality of interlaces, and the instructions are further executable by the processor to cause the apparatus to:

receive the plurality of feedback indications via the first interlace, a second interlace, or both, wherein the second interlace is a common interlace.

22. The apparatus of claim 13, wherein the instructions are further executable by the processor to cause the apparatus to:

transmit an indication for the second UE to transmit the plurality of feedback indications via a first resource pool or a second resource pool, wherein the first resource pool is a default resource pool and the second resource pool is a capacity enhanced resource pool.

23. The apparatus of claim 22, wherein the first resource pool and the second resource pool are multiplexed across the bandwidth of the sidelink channel according to a frequency division multiplexing scheme, a time division multiplexing scheme, a code division multiplexing scheme, or any combination thereof.

24. The apparatus of claim 22, wherein the indication is transmitted via a downlink control information message, a medium access control control element, or a radio resource control message.

25. A method for wireless communications at a first user equipment (UE), comprising:

receiving, from a second UE, a sidelink message via a set of resources of a sidelink channel;

transmitting, via a sidelink feedback channel to the second UE and in accordance with an interlace, a plurality of feedback indications associated with the sidelink message via one or more configurable resources, the interlace indicating a plurality of frequency resources, wherein a first subset of the plurality of frequency resources comprises the one or more configurable resources; and transmitting one or more dummy signals via remaining frequency resources of the first subset, via one or more frequency resources of a second subset of the plurality of frequency resources, or both.

26. The method of claim 25, further comprising:

transmitting, at a first time, a first quantity of feedback indications via the one or more configurable resources at a first transmit power; and transmitting, at a second time, a second quantity of feedback indications via the one or more configurable resources at a second transmit power, wherein the first quantity is a same quantity as the second quantity and the first transmit power is lower than the second transmit power.

27. A method for wireless communications at a first user equipment (UE), comprising:

transmitting, to at least a second UE, a sidelink message via a set of resource of a sidelink channel;

receiving, from the second UE via a sidelink feedback channel, a plurality of feedback indications associated with the sidelink message via one or more configurable resources in accordance with an interlace, the interlace indicating a plurality of frequency resources, wherein a first subset of the plurality of frequency resources comprises the one or more configurable resources; and receiving one or more dummy signals via remaining frequency resources of the first subset, via one or more frequency resources of a second subset of the plurality of frequency resources, or both.

28. The method of claim 27, further comprising:

receiving, at a first time, a first quantity of feedback indications via the one or more configurable resources at a first power; and receiving, at a second time, a second quantity of feedback indications via the one or more configurable resources at a second power, wherein the first quantity is less than the second quantity and the first power is lower than the second power.

* * * * *